United States Patent
Wang et al.

(10) Patent No.: US 12,356,371 B2
(45) Date of Patent: *Jul. 8, 2025

(54) TECHNIQUES FOR CONFIGURING COMPONENT CARRIERS FOR SIDELINK COMMUNICATIONS

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Fairless Hills, PA (US); Yan Zhou, San Diego, CA (US); Hong Cheng, Basking Ridge, NJ (US); Jelena Damnjanovic, Del Mar, CA (US); Peter Gaal, San Diego, CA (US); Jung Ho Ryu, Fort Lee, NJ (US); Qing Li, Princeton Junction, NJ (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 683 days.

This patent is subject to a terminal disclaimer.

(21) Appl. No.: 17/506,636

(22) Filed: Oct. 20, 2021

(65) Prior Publication Data

US 2023/0123622 A1 Apr. 20, 2023

(51) Int. Cl.
*H04W 72/02* (2009.01)
*H04L 5/00* (2006.01)
(Continued)

(52) U.S. Cl.
CPC ............ *H04W 72/02* (2013.01); *H04L 5/001* (2013.01); *H04L 27/26025* (2021.01); *H04W 72/044* (2013.01)

(58) Field of Classification Search
CPC .......... H04L 27/2601; H04L 27/26025; H04L 5/001; H04L 5/0044; H04L 5/0053;
(Continued)

(56) References Cited

U.S. PATENT DOCUMENTS

| | | | |
|---|---|---|---|
| 11,743,866 B2 * | 8/2023 | Balasubramanian | ..................... H04W 72/02 370/329 |
| 12,028,781 B2 * | 7/2024 | Selvanesan | ........... H04W 4/025 |

(Continued)

FOREIGN PATENT DOCUMENTS

| CN | 103248586 A | * | 8/2013 | ........... H04L 5/0051 |
|---|---|---|---|---|
| WO | WO-2022010119 A1 | * | 1/2022 | ........... H04L 5/0053 |

*Primary Examiner* — Phuc H Tran
(74) *Attorney, Agent, or Firm* — Holland & Hart LLP

(57) ABSTRACT

Methods, systems, and devices for wireless communications are described. A first user equipment (UE) may receive control signaling indicating a set of component carriers allocated for sidelink communications performed by the first UE. The first UE may receive a message indicating a subset of component carriers from the set of component carriers for use in communicating via a sidelink between the first UE and a second UE, where the subset of component carriers may be supported by the first UE and the second UE. In some cases, a base station or anchor UE may determine or configure the subset of component carriers for use between the first and second UEs. In some cases, the first UE, the second UE, or a both may determine the subset of component carriers. The first UE may communicate with the second UE via a component carrier from the subset of component carriers.

29 Claims, 16 Drawing Sheets

(51) Int. Cl.
*H04L 27/26* (2006.01)
*H04W 72/044* (2023.01)

(58) Field of Classification Search
CPC .. H04L 5/0094; H04W 72/02; H04W 72/044; H04W 72/0453; H04W 72/231; H04W 72/25; H04W 72/40; H04W 76/14
See application file for complete search history.

(56) References Cited

U.S. PATENT DOCUMENTS

| | | | | |
|---|---|---|---|---|
| 2016/0183241 A1* | 6/2016 | Lee | | H04W 56/0015 455/425 |
| 2017/0367059 A1* | 12/2017 | Park | | H04L 5/0048 |
| 2019/0037621 A1* | 1/2019 | Feng | | H04W 28/0278 |
| 2019/0158993 A1* | 5/2019 | Kwon | | H04L 1/1893 |
| 2019/0215685 A1* | 7/2019 | Wang | | H04W 4/40 |
| 2019/0239112 A1* | 8/2019 | Rao | | H04L 1/08 |
| 2019/0239178 A1* | 8/2019 | Shilov | | H04W 56/002 |
| 2020/0205166 A1* | 6/2020 | Huang | | H04W 76/27 |
| 2020/0221467 A1* | 7/2020 | Huang | | H04W 72/23 |
| 2020/0235887 A1* | 7/2020 | Hou | | H04L 5/0053 |
| 2020/0344721 A1* | 10/2020 | Xing | | H04W 72/02 |
| 2020/0396717 A1* | 12/2020 | Luo | | H04W 76/14 |
| 2021/0105775 A1* | 4/2021 | Tseng | | H04W 72/02 |
| 2022/0417926 A1* | 12/2022 | Balasubramanian | | H04W 72/56 |
| 2023/0300857 A1* | 9/2023 | Deng | | H04L 5/0094 370/329 |

* cited by examiner

TECHNIQUES FOR CONFIGURING COMPONENT CARRIERS FOR SIDELINK COMMUNICATIONS

FIELD OF TECHNOLOGY

The following relates to wireless communications, including techniques for configuring component carriers for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a user equipment (UE) may communicate with one or more other UEs via sidelink communication links. In some cases, the UE may be configured to use carrier aggregation for the sidelink communications in which the UE may communicate with the one or more other UEs using one or more component carriers. Techniques for applying carrier aggregation to sidelink communications may be improved.

SUMMARY

The described techniques relate to improved methods, systems, devices, and apparatuses that support techniques for configuring component carriers for sidelink communications. Generally, the described techniques provide for enhanced methods for implementing carrier aggregation in sidelink communications. A first UE may determine to communicate with a second UE via a sidelink between the first UE and the second UE. In some cases, the first UE may be configured with a first set of component carriers and the second UE may be configured with a second set of component carriers to use for sidelink communications. However, in order to communicate, the first UE and the second UE should both be configured with at least one component carrier that is the same or otherwise overlaps. The techniques described herein describe methods for configuring at least one common component carrier between a pair of UEs to allow the UEs to communicate over a sidelink in accordance with carrier aggregation. In some cases, a base station (e.g., or anchor UE) may determine or configure one or more common component carriers for a pair of UEs to use. In some cases, the pair of UEs may determine one or more common component carriers between the pair.

For example, a first UE may receive control signaling (e.g., from a base station, or from other UEs, such as an anchor UE) indicating a set of component carriers allocated for sidelink communications performed by the first UE. The first UE may determine to communicate with a second UE via a sidelink between the first UE and the second UE. The first UE may receive a message (e.g., a UU message from a base station, or a PC5 message from the second UE or some other UE) indicating a subset of component carriers from the set of component carriers for use in communicating via the sidelink between the first UE and a second UE. The subset of component carriers may be supported by the first UE and the second UE. Accordingly, the first UE may communicate with the second UE via a component carrier from the subset of component carriers due to the component carrier being supported by both the first UE and the second UE.

A method for wireless communications at a first user equipment (UE) is described. The method may include receiving control signaling indicating a set of component carriers allocated for sidelink communications performed by the first UE, receiving a message indicating a subset of component carriers from the set of component carriers for use in communicating via a sidelink between the first UE and a second UE, where the subset of component carriers are supported by the first UE and the second UE, and communicating with the second UE via a component carrier from the subset of component carriers.

An apparatus for wireless communications at a first UE is described. The apparatus may include a processor, memory coupled with the processor, and instructions stored in the memory. The instructions may be executable by the processor to cause the apparatus to receive control signaling indicating a set of component carriers allocated for sidelink communications performed by the first UE, receive a message indicating a subset of component carriers from the set of component carriers for use in communicating via a sidelink between the first UE and a second UE, where the subset of component carriers are supported by the first UE and the second UE, and communicate with the second UE via a component carrier from the subset of component carriers.

Another apparatus for wireless communications at a first UE is described. The apparatus may include means for receiving control signaling indicating a set of component carriers allocated for sidelink communications performed by the first UE, means for receiving a message indicating a subset of component carriers from the set of component carriers for use in communicating via a sidelink between the first UE and a second UE, where the subset of component carriers are supported by the first UE and the second UE, and means for communicating with the second UE via a component carrier from the subset of component carriers.

A non-transitory computer-readable medium storing code for wireless communications at a first UE is described. The code may include instructions executable by a processor to receive control signaling indicating a set of component carriers allocated for sidelink communications performed by the first UE, receive a message indicating a subset of component carriers from the set of component carriers for use in communicating via a sidelink between the first UE and a second UE, where the subset of component carriers are supported by the first UE and the second UE, and communicate with the second UE via a component carrier from the subset of component carriers.

Some examples of the method, apparatuses, and non-transitory computer-readable medium described herein may further include operations, features, means, or instructions for determining to communicate with the second UE via the sidelink and transmitting, to a base station, a signal including information associated with the sidelink between the first UE and the second UE.

In some examples of the method, apparatuses, and non-transitory computer-readable medium described herein, the information includes a destination identifier associated with the second UE and the sidelink.

In some examples of the method, apparatuses, and non-transitory computer-readable medium described herein, receiving the message indicating the subset of component carriers may include operations, features, means, or instructions for receiving, from the base station, the message indicating the subset of component carriers based on the transmitted signal.

In some examples of the method, apparatuses, and non-transitory computer-readable medium described herein, receiving the message indicating the subset of component carriers may include operations, features, means, or instructions for receiving the message including a sidelink identifier, where the sidelink identifier indicates the sidelink over which the subset of component carriers may be used.

In some examples of the method, apparatuses, and non-transitory computer-readable medium described herein, receiving the message indicating the subset of component carriers may include operations, features, means, or instructions for receiving a radio resource control signal, or a medium access control (MAC) control element (MAC-CE) signal including the message.

Some examples of the method, apparatuses, and non-transitory computer-readable medium described herein may further include operations, features, means, or instructions for transmitting, to the second UE, an indication of the set of component carriers allocated to the first UE for the sidelink communications.

In some examples of the method, apparatuses, and non-transitory computer-readable medium described herein, receiving the message indicating the subset of component carriers may include operations, features, means, or instructions for performing a common component carrier determination procedure with the second UE to determine the subset of component carriers that may be supported by the first UE and the second UE based on transmitting the indication to the second UE.

In some examples of the method, apparatuses, and non-transitory computer-readable medium described herein, the indication of the set of component carriers includes a frequency identifier, a frequency reference point, a bandwidth, a subcarrier spacing, an offset, a bandwidth part, or a combination thereof associated with each component carrier of the set of component carriers.

Some examples of the method, apparatuses, and non-transitory computer-readable medium described herein may further include operations, features, means, or instructions for receiving, from the second UE, a request for information associated with the subset of component carriers based on the transmitted indication of the set of component carriers by the first UE.

In some examples of the method, apparatuses, and non-transitory computer-readable medium described herein, transmitting the indication to the second UE may include operations, features, means, or instructions for transmitting the indication via the component carrier supported by the first UE and the second UE, where the component carrier was indicated to at least the first UE by a base station.

In some examples of the method, apparatuses, and non-transitory computer-readable medium described herein, transmitting the indication to the second UE may include operations, features, means, or instructions for transmitting the indication via a sidelink radio resource control message.

In some examples of the method, apparatuses, and non-transitory computer-readable medium described herein, receiving the message indicating the subset of component carriers may include operations, features, means, or instructions for receiving the message indicating multiple subsets of component carriers and a sidelink identifier associated with each of the multiple subsets of component carriers, where each sidelink identifier may be indicative of a different sidelink.

In some examples of the method, apparatuses, and non-transitory computer-readable medium described herein, receiving the message indicating the subset of component carriers may include operations, features, means, or instructions for receiving the message including a length field, the length field indicating a number of component carriers, a number of octets, or a combination thereof associated with each sidelink identifier.

In some examples of the method, apparatuses, and non-transitory computer-readable medium described herein, receiving the control signaling indicating the set of component carriers may include operations, features, means, or instructions for receiving, from a base station, a radio resource control message, or a medium access control (MAC) control element (MAC-CE) message indicating the set of component carriers.

In some examples of the method, apparatuses, and non-transitory computer-readable medium described herein, receiving the message indicating the subset of component carriers may include operations, features, means, or instructions for receiving, from the second UE, the message indicating the subset of component carriers, where the second UE may be an anchor UE to the first UE.

In some examples of the method, apparatuses, and non-transitory computer-readable medium described herein, receiving the control signaling indicating the set of component carriers may include operations, features, means, or instructions for receiving, from the second UE, the message indicating the set of component carriers, where the second UE may be an anchor UE to the first UE.

A method for wireless communications at a base station is described. The method may include transmitting, to a first UE, control signaling indicating a set of component carriers allocated for sidelink communications for use by the first UE and transmitting a message indicating a subset of component carriers from the set of component carriers for the first UE to use in communicating via a sidelink between the first UE and a second UE, where the subset of component carriers are supported by the first UE and the second UE.

An apparatus for wireless communications at a base station is described. The apparatus may include a processor, memory coupled with the processor, and instructions stored in the memory. The instructions may be executable by the processor to cause the apparatus to transmit, to a first UE, control signaling indicating a set of component carriers allocated for sidelink communications for use by the first UE and transmit a message indicating a subset of component carriers from the set of component carriers for the first UE to use in communicating via a sidelink between the first UE and a second UE, where the subset of component carriers are supported by the first UE and the second UE.

Another apparatus for wireless communications at a base station is described. The apparatus may include means for transmitting, to a first UE, control signaling indicating a set of component carriers allocated for sidelink communications for use by the first UE and means for transmitting a message indicating a subset of component carriers from the set of component carriers for the first UE to use in communicating via a sidelink between the first UE and a second UE, where the subset of component carriers are supported by the first UE and the second UE.

A non-transitory computer-readable medium storing code for wireless communications at a base station is described. The code may include instructions executable by a processor to transmit, to a first UE, control signaling indicating a set of component carriers allocated for sidelink communications for use by the first UE and transmit a message indicating a subset of component carriers from the set of component carriers for the first UE to use in communicating via a sidelink between the first UE and a second UE, where the subset of component carriers are supported by the first UE and the second UE.

Some examples of the method, apparatuses, and non-transitory computer-readable medium described herein may further include operations, features, means, or instructions for receiving, from the first UE, the second UE, or both, a signal including information associated with the sidelink between the first UE and the second UE.

In some examples of the method, apparatuses, and non-transitory computer-readable medium described herein, the information includes a destination identifier associated with the second UE and the sidelink.

Some examples of the method, apparatuses, and non-transitory computer-readable medium described herein may further include operations, features, means, or instructions for determining the subset of component carriers that may be common between the first UE and the second UE based on the received signal, where transmitting the message indicating the subset of component carriers may be based on the determination.

In some examples of the method, apparatuses, and non-transitory computer-readable medium described herein, transmitting the message indicating the subset of component carriers may include operations, features, means, or instructions for transmitting the message including a sidelink identifier, where the sidelink identifier indicates the sidelink over which the subset of component carriers may be used by the first UE.

In some examples of the method, apparatuses, and non-transitory computer-readable medium described herein, transmitting the message indicating the subset of component carriers may include operations, features, means, or instructions for transmitting a radio resource control signal, or a medium access control (MAC) control element (MAC-CE) signal including the message.

In some examples of the method, apparatuses, and non-transitory computer-readable medium described herein, transmitting the message indicating the subset of component carriers may include operations, features, means, or instructions for transmitting the message indicating multiple subsets of component carriers and a sidelink identifier associated with each of the multiple subsets of component carriers, where each sidelink identifier may be indicative of a different sidelink of the first UE.

In some examples of the method, apparatuses, and non-transitory computer-readable medium described herein, transmitting the message indicating the subset of component carriers may include operations, features, means, or instructions for transmitting the message including a length field, the length field indicating a number of component carriers, a number of octets, or a combination thereof associated with each sidelink identifier.

Some examples of the method, apparatuses, and non-transitory computer-readable medium described herein may further include operations, features, means, or instructions for transmitting, to the second UE, the message indicating the subset of component carriers for the second UE to use in communicating via the sidelink between the first UE and the second UE.

Some examples of the method, apparatuses, and non-transitory computer-readable medium described herein may further include operations, features, means, or instructions for determining to update the subset of component carriers for the first UE and the second UE, where transmitting the message indicating the subset of component carriers may be based on the determination.

Some examples of the method, apparatuses, and non-transitory computer-readable medium described herein may further include operations, features, means, or instructions for determining to update the set of component carriers for the first UE, where transmitting the control signaling indicating the set of component carriers may be based on the determination.

DETAILED DESCRIPTION

Figure 1:
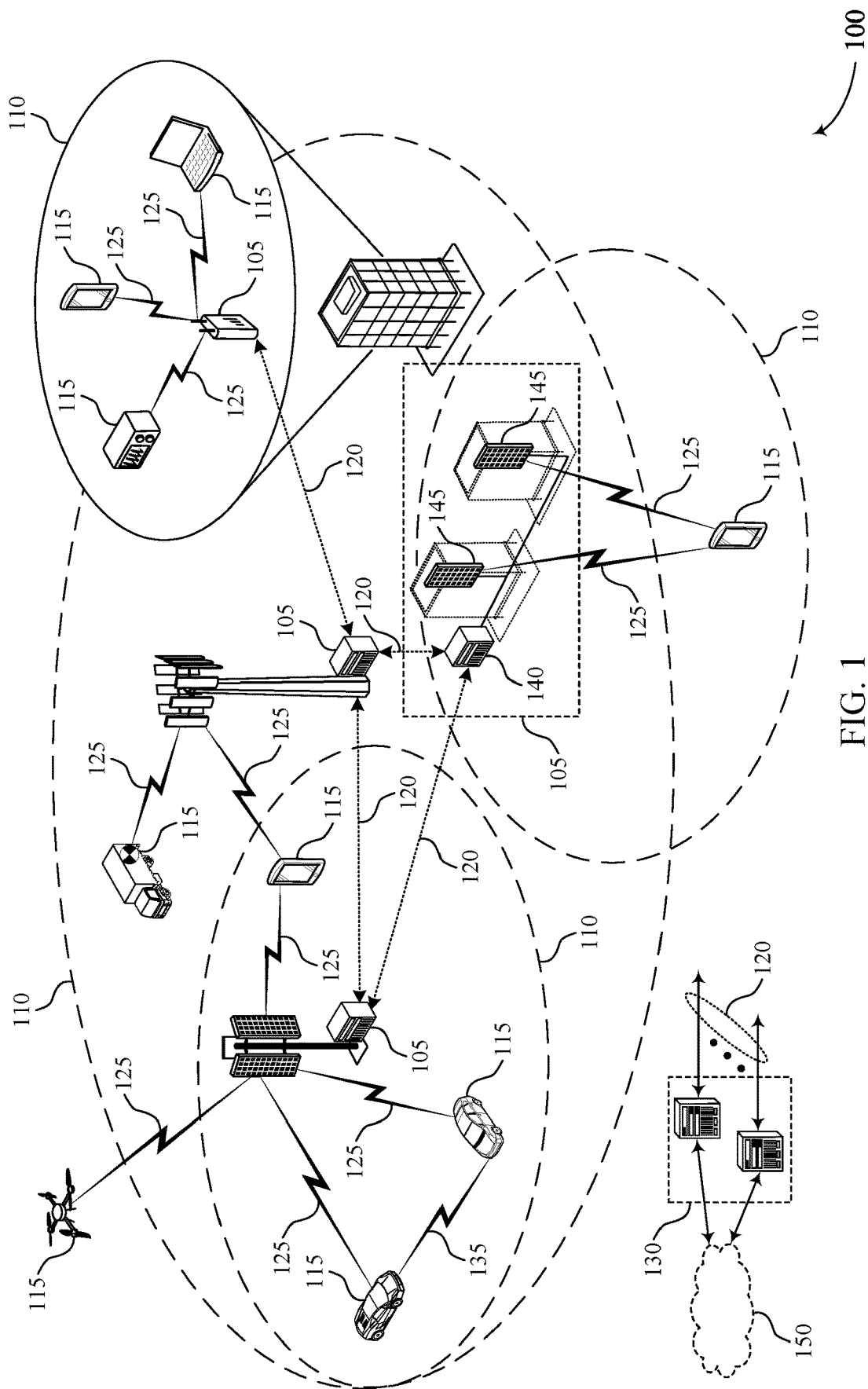
FIG. 1 illustrates an example of a wireless communications system that supports techniques for configuring component carriers for sidelink communications in accordance with aspects of the present disclosure.

Some wireless communications systems may support sidelink communications. Sidelink communications may allow direct communication between two or more user equipment (UEs). It is noted that while various examples provided herein are discussed for UE sidelink devices, such sidelink techniques may be used for any type of wireless devices that use sidelink communications. For example, a sidelink may support one or more of device-to-device (D2D) communication, vehicle-to-vehicle (V2V) communication, vehicle-to-everything (V2X) communication, and the like.

Carrier aggregation may support higher data rates and flexibility. Accordingly, in some wireless communications systems, carrier aggregation may be supported for sidelink communications. In some aspects, sidelink carrier aggregation for sidelink communications (e.g., using NR technologies, or LTE technologies) may provide additional carrier frequencies and operation scenarios, which may support increased flexibility for operations in a sidelink spectrum. In some examples, sidelink carrier aggregation may support frequency spectrum bands such as FR2 (e.g., above 24.250~52.6 GHz, millimeter wave (mmW)) in addition to FR1 (e.g., below 7.225 GHz), among others. Carrier aggregation in sidelink communications may support higher data rates and operation flexibility using different available sidelink carrier frequencies.

To perform sidelink communications using carrier aggregation, a UE may be configured with a set of component carriers to use for such sidelink communications. In some cases, a base station may allocate a set of component carriers per each UE to use for sidelink communications. In some cases, two UEs may determine to communicate with one another over a sidelink but the two UEs may not be configured with a common component carrier.

To improve sidelink communications using carrier aggregation, component carriers may be configured per sidelink. In some cases, a base station (or anchor UE) may configure a UE with one or more component carriers for the UE to use for a particular sidelink. For example, a first UE may determine to communicate with a second UE and accordingly may transmit a message to the base station including information indicative of the particular sidelink, such as a destination identity of the sidelink. The base station may use the sidelink information to determine at least one common component carrier for the sidelink between the first and second UE and the base station may transmit a message (e.g., a UU message, a medium access control (MAC) control element (MAC-CE) message, a radio resource control (RRC) message) to the first UE, the second UE or both, indicating the at least one common component carrier. In some cases, a common component carrier for a particular sidelink may be determined between the two UEs associated with the particular sidelink (e.g., via PC5 signaling). In such cases, a base station may configure each UE with a UE-specific set of component carriers (that are not based on particular sidelink). Then, upon determining to communicate with the second UE, the first UE and the second UE may exchange UE-specific component carrier information and may use the information to identify any common component carriers between the two UEs. If the first UE, the second UE, or both determine that the two UEs are not configured with a common component carrier, one or both of the UEs may transmit a request to a base station (or anchor UE) to be configured with a common component carrier.

Particular aspects of the subject matter described herein may be implemented to realize one or more advantages. The described techniques may support improvements in configuring component carriers for sidelink communications by identifying one or more common component carriers for a particular sidelink. Such techniques may improve reliability, decrease signaling overhead, and decrease latency among other advantages. As such, supported techniques may include improved network operations and, in some examples, may promote network efficiencies, among other benefits.

Aspects of the disclosure are initially described in the context of wireless communications systems. Aspects are then described with reference to component carrier information formats, and a process flow. Aspects of the disclosure are further illustrated by and described with reference to apparatus diagrams, system diagrams, and flowcharts that relate to techniques for configuring component carriers for sidelink communications.

FIG. 1 illustrates an example of a wireless communications system 100 that supports techniques for configuring component carriers for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as wireless communications systems 100, UEs 115 may communicate over sidelinks (e.g., PC5 links), and in some cases, may be configured to communicate over a sidelink using carrier aggregation. For two UEs 115 to be able to communicate using carrier aggregation, the two UEs 115 should use a same component carrier (e.g., referred to as a common component carrier, overlapping component carrier, etc.). The techniques described herein allow for a first UE 115 to receive control signaling (e.g., from a base station 105, or from other UE 115, such as an anchor UE 115) indicating a set of component carriers allocated for sidelink communications performed by the first UE 115. The first UE 115 may determine to communicate with a second UE 115 via a sidelink between the first UE 115 and the second UE 115. The first UE 115 may receive a message (e.g., a Uu message from a base station 105, or a PC5 message from the second UE 115, or some other UE 115) indicating a subset of component carriers from the set of component carriers for use in communicating via the sidelink between the first UE 115 and a second UE 115. The subset of component carriers may be supported by the first UE 115 and the second UE 115. Accordingly, the first UE 115 may communicate with the second UE 115 via a component carrier from the subset of component carriers due to the component carrier being supported by both the first UE 115 and the second UE 115.

Figure 2:
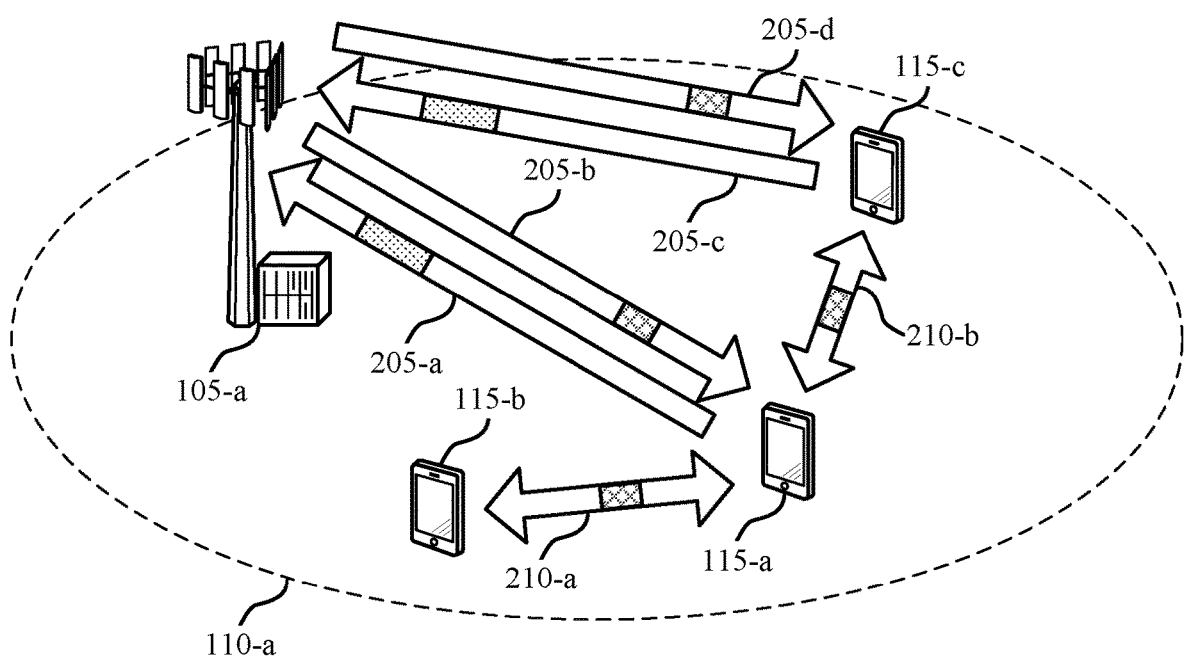
FIG. 2 illustrates an example of a wireless communications system that supports techniques for configuring component carriers for sidelink communications in accordance with aspects of the present disclosure.

FIG. 2 illustrates an example of a wireless communications system 200 that supports techniques for configuring component carriers for sidelink communications in accordance with aspects of the present disclosure. The wireless communications system 200 may include base station 105-*a* and UEs 115-*a*, 115-*b*, and 115-*c*, which may be examples of a base station 105 and UEs 115 as described with reference to FIG. 1. Base station 105-*a* may serve a geographic coverage area 110-*a*. In some cases, UE 115-*a* may perform a component carrier determination procedure for identifying a component carrier that may be used for a particular sidelink. Additionally or alternatively, other wireless devices, such as a base station 105, may implement a same or similar procedure for identifying sidelink component carriers.

Wireless communications system 200 may support sidelink communications which may allow direct communication between two or more UEs 115. For example, base station 105-*a* may serve one or more UEs 115, such as UEs 115-*a*, 115-*b*, and 115-*c*. In some cases, each of UEs 115-*a*, 115-*b*, and 115-*c* may communicate with base station 105-*b* via a communication link, such as a Uu link. For example, UE 115-*a* may transmit messages to base station 105-*a* via communication link 205-*a* (e.g., an uplink communication link), and may receive messages from base station 105-*a* via communication link 205-*b* (e.g., a downlink communication link). Similarly, UE 115-*b* may communicate with base station 105-*a* via communication links 205-*c*, and 205-*d*.

In some cases, each of UEs 115-*a*, 115-*b*, and 115-*c* may communicate with one or more other UEs 115 via a sidelink communication link, such as a PC5 link. For example, UE 115-*a* may communicate with UE 115-*b* via sidelink 210-*a*, and may communicate with UE 115-*c* via sidelink 210-*b*. The devices (e.g., UEs 115, base station 105) described herein may communicate with one or more other devices (e.g., UEs 115, base station 105) at the same time, in overlapping times, or at different times, such that a device such as UE 115-*a* may perform UU communications and PC5 communications concurrently.

In some wireless communications systems, carrier aggregation may be supported for sidelink communications. Carrier aggregation in sidelink communications may support higher data rates and operation flexibility using different available sidelink carrier frequencies. As such, sidelink carrier aggregation may be useful for high data-rate applications (e.g., NCIS), or for certain use-cases (e.g., V2X use cases).

To perform sidelink communications using carrier aggregation, a UE 115 may be configured with sidelink resources. In some cases, sidelink resources may be configured in a hierarchic procedure. For example, a UE 115 may be configured with a component carrier, then a bandwidth part within a component carrier, and then with a resource pool within the bandwidth part. The UE 115 may receive an indication of a frequency resource reference point (e.g., point A), and an offset to carrier indication that is cell-specific to indicate a cell specific channel bandwidth. The UE may receive an offset to carrier that is UE-specific to indicate a UE-specific channel bandwidth. The UE may receive a resource block start to indicate an offset associated with a BWP from the start of the cell specific channel bandwidth and may receive a length of the resource block, and a start of the resource block to indicate an offset from the start of the BWP to the start of a sidelink resource pool. A sidelink bandwidth part message (e.g., Sl-BWP-Generic) may configure BWP location and bandwidth (e.g., BWP locationAndBandwidth), SCS, CP, a number of symbols (e.g., sl-LengthSymbols), a starting symbol (e.g., sl-StartSymbol), etc. A sidelink BWP pool message (e.g., Sl-BWP-PoolConfig) may configure a transmitting and/or receiving resource pool with starting resource block (e.g., startRB), sub-channel number (e.g., numSubChannel), sub-channel size (e.g., subChannelSize), a time resource (e.g., timeResource), and a physical sidelink feedback channel (PFSCH) configuration (e.g., PSFCH-Config), etc.

A UE 115 may be configured with a set of component carriers to use for such sidelink communications, including a primary component carrier (PCC) and one or more secondary component carriers (SCC). The PCC may be supported by a primary cell (PCell) to which the UE is camped, and each SCC may be supported by a secondary serving cell (SCell). In some cases, a base station 105 may allocate a set of component carriers per each UE 115 to use for sidelink communications, where the base station may indicate a PCC and one or more SCCs for use by a UE 115. The base station 105 may update a set of component carriers by activating and/or deactivating one or more of the SCCs. In some cases, the base station 105 may configure a UE 115 with a set of component carriers to use for Uu communications, and another set of component carriers to use for PC5 communications, where the two sets of component carriers may include different or overlapping component carriers.

Accordingly, base station 105-*a* may configure (e.g., pre-configure) UE 115-*a* with a first set of sidelink component carriers and may configure UE 115-*b* with a second set of sidelink component carriers. In some cases, UEs 115-*a* and 115-*b* may determine to communicate with one another over a sidelink 210. However, base station 105-*a* may not have configured the first and second set of sidelink component carriers to necessarily include any overlapping component carriers. As such, UEs 115-*a* and 115-*b* may not be configured with a common sidelink component carrier over which to communicate. In some cases, UE 115-*a* and 115-*b* may even be configured with different Uu PCells (e.g., Uu PCCs).

In such cases, the transmitting UE 115 may refrain from transmitting messages (e.g., sidelink control channel messages, such as physical sidelink control channel (PSCCH) messages, or sidelink shared channel message, such as physical sidelink shared channel (PSSCH) messages, or both) to a receiving UE 115 if the two UEs 115 are not configured with at least one overlapping component carrier.

To improve sidelink communications using carrier aggregation, a common component carrier may be determined for a pair of UEs 115, such that the common component carrier may be configured for the particular sidelink between the pair. In some implementations, a serving device (e.g., a base station 105, an anchor UE 115) may configure and/or identify a common component carrier for a pair of UEs 115. In some implementations, one or both of the UEs 115 in a pair may identify a common component carrier. In some implementations, one or both of the UEs 115 in a pair and a serving device (e.g., a base station 105, an anchor UE 115) may identify a common component carrier for the pair of UEs 115.

For example, UE 115-*a* may determine to communicate with UE 115-*b* and UE 115-*a* may determine sidelink information 220 (e.g., sidelinkUEInformation, such sidelinkUEInformationNR) associated with the sidelink between UE 115-*a* and 115-*b*. For example, UE 115-*a* may identify a destination identity of the sidelink (e.g., sl-Destination-Identity) and may transmit the sidelink information 220 to a serving device, such as base station 105-*a*. Similarly, UE 115-*b* may determine to communicate with UE 115-*a* and may transmit a message to base station 105-*a* indicating sidelink information 220 associated with the sidelink between UE 115-*a* and UE 115-*b*. Base station 105-*a* may receive the sidelink information 220 from UE 115-*a*, UE 115-*b*, or both. Upon receiving the sidelink information 220 from one or both of the UEs 115, base station 105-*a* may identify the two UEs 115 that have determined to communicate with one another, such as by the sidelink information 220 and base station 105-*a* may identify or configure at least one common component carrier for use by the two UEs 115.

In some cases, prior to receiving sidelink information 220, base station 105-*a* may have configured UE 115-*a* with a first set of component carriers and UE 115-*b* with a second set of component carriers. Then, upon receiving the sidelink information 220 from one or both of the UEs 115, base station 105-*a* may determine whether the first set of component carriers and the second set of component carriers include at least one common component. If base station 105-*a* identifies at least one common component carrier, base station 105-*a* may transmit a message to UE 115-*a*, UE 115-*b*, or both indicating the at least one common component carrier.

If base station 105-*a* determines that the first and second sets of component carriers do not include at least one common component carrier, then base station 105-*a* may identify a component carrier that may be used for the particular sidelink. In some cases, base station 105-*a* may identify at least one component carrier from the first set of component carriers that UE 115-*a* is configured with and then configure UE 115-*b* with the at least one identified component carrier. Accordingly, base station 105-*a* may update the second set of component carriers to include the at least one identified component carrier (from the first set of component carriers). In some cases, upon determining that the first and second set of component carriers do not include at least one common component carrier, base station 105-*a* may identify at least one component carrier new to both UE 115-*a* and UE 115-*b*, such that the at least one common component carrier was not already included in the first and second sets of component carriers. Accordingly, base station 105-*a* may update the first and second sets of component carriers to include the new at least one common component carrier.

Upon updating the first set of component carriers, the second set of component carriers, or both base station 105-*a* may indicate the updated sets of component carriers to the respective UE 115, and/or indicate the at least one common component carrier (e.g., component carrier information 215). In some cases, base station 105-*a* may transmit the component carrier information 215 via RRC signaling, or via MAC-CE signaling, or both, as described in more detail with reference to FIGS. 3A and 3B. As such, UE 115-*a*, UE 115-*b*, or both may receive the indication from base station 105-*a* and identify the at least one common component carrier between the pair of UEs 115. UE 115-*a* and UE 115-*b* may perform sidelink communications with one another using the at least one common component carrier.

In some cases, upon determining to communicate, UE 115-*a* and UE 115-*b* may identify a common component carrier (e.g., without transmitting sidelink information 220 to base station 105-*a*). In such cases, UE 115-*a* and/or UE 115-*b* may exchange sidelink component carrier information to identify a common component carrier. For example, base station 105-*a* may have configured UE 115-*a* with a first set of sidelink component carriers, and configured UE 115-*b* with a second set of component carriers. Then, upon determining to communicate, UE 115-*a* may transmit an indication of the first set of component carriers to UE 115-*b*. UE 115-*b* may receive the indication and identify whether there is at least one common component carrier in the first set and the second set of component carriers. If UE 115-*b* identifies a common component carrier, UE 115-*b* may communicate with UE 115-*a* using the at least one common component carrier. In some cases, UE 115-*b* may transmit a message to UE 115-*a* indicating the at least one common component carrier.

Additionally or alternatively, UE 115-*b* may transmit an indication of the second set of component carriers to UE 115-*a*. UE 115-*a* may receive the indication and identify whether there is at least one common component carrier in the first set and the second set of component carriers. If UE 115-*a* identifies a common component carrier, UE 115-*a* may communicate with UE 115-*b* using the at least one common component carrier. In some cases, UE 115-*a* may transmit a message to UE 115-*b* indicating the at least one common component carrier.

In some implementations, UE 115-*a* and UE 115-*b* may perform a component carrier agreement procedure to agree on at least one component carrier to use for sidelink communications between the pair. As such, UE 115-*a*, UE 115-*b*, or both may exchange the set of component carriers the respective UE 115 is configured with. In some cases, UE 115-*a*, UE 115-*b*, or both may exchange whole Uu configured component carrier information. For example, when being configured with the first set of component carriers, UE 115-*a* may have received a set of parameters that define the first set of component carriers, where the set of parameters may include Freq-Id, point-A, BW, SCS, offset, BWP, etc. In some cases, UE 115-*a*, UE 115-*b*, or both may exchange a subset of Uu configured component carrier information (e.g., a subset of parameters that define a set of component carriers, such as Freq-Id, point-A, BW, SCS, offset, BWP).

In some cases, UE 115-*a*, UE 115-*b*, or both may exchange a first set of information (e.g., key information, such as Freq-Id, point-A, BW). Then, the receiving UE 115 of the first set of information may request for additional information on the component carriers the transmitting UE 115 is configured with. For example, UE 115-*a* may transmit the first set of information to UE 115-*b*, and UE 115-*b* may determine whether to request for additional component carrier information 215 from UE 115-*a* (based on the first set of information). Similarly, UE 115-*b* may transmit the first set of information to UE 115-*a* and UE 115-*a* may determine whether to request additional component carrier information 215 from UE 115-*b*.

In some cases, the component carrier information 215 (e.g., transmitted by base station 105-*a*, by UE 115-*a*, or by UE 115-*b*) indicating one or more common component carriers for a particular sidelink (e.g., between UE 115-*a* and UE 115-*b*) may include a BWP configuration within each component carrier, the sidelink resource pool within each BWP, or both.

Upon exchanging component carrier information 215, UE 115-*a*, UE 115-*b*, or both may identify at least one common component carrier that the two UEs 115 are both configured with. UE 115-*a* and UE 115-*b* may exchange a series of messages between one another to agree upon one or more common component carriers to be used between the pair. UE 115-*a*, UE 115-*b*, or both may exchange component carrier information, perform the component carrier agreement procedure, etc. via PC5 signaling, such as PC5 RRC signaling.

Figure 3A:
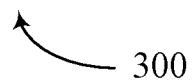
FIGS. 3A and 3B illustrate examples of component carrier information formats that support techniques for configuring component carriers for sidelink communications in accordance with aspects of the present disclosure.
Figure 3B:

In some cases, prior to establishing a common component carrier, UE 115-*a* and UE 115-*b* may communicate with one another to exchange component carrier information, perform the component carrier agreement procedure, etc. via a common component carrier established via Uu RRC signaling or via pre-configuration. For example, base station 105-*a* may configure a set of UEs 115 (e.g., all UEs 115 being served by base station 105-*a*, a set of UEs 115 in a particular location) with one or more group-common sidelink component carriers (e.g., R, as depicted in FIGS. 3A and 3B). In some cases, the set of UEs 115 may use the one or more group-common sidelink component carriers only for initial sidelink communications such as to identify a different component carrier that two UEs 115 are both configured with on a UE-specific basis.

In some implementations, UE 115-*a* and UE 115-*b* may be configured to identify one or more common component carriers by exchanging signaling with one another. However, in some cases, upon exchanging component carrier information 215, UE 115-*a* and/or UE 115-*b* may determine that the two UEs 115 are not configured with at least one common component carrier (e.g., the first set and second set of component carriers do not include at least one common component carrier). In such cases, UE 115-*a*, UE 115-*b*, or both may transmit a message to base station 105-*a* requesting that base station 105-*a* configures a common component carrier to be used between the two UEs 115 (e.g., where the request may include the sidelink destination identity).

Accordingly, base station 105-*a* may receive one or both requests and configure a common component carrier as described herein.

In some cases, component carriers may be updated. For example, not all configured component carriers may be used all the time for sidelink communications. Rather, a subset of component carriers may be dynamically activated. Accordingly, a UE 115 may be configured with a set of sidelink component carriers and the UE may receive a message (e.g., a MAC-CE message) indicating one or more component carriers from the set that are activated and/or one or more component carriers that are deactivated. The message may activate and/or deactivate component carriers per UE (e.g., where a same or similar format used to activate/deactivate Uu SCells may be used), or per link. In the case of per link, the message may include a sidelink identifier to indicate the component carriers are being activated/deactivated for the particular link.

In some cases, a UE 115 may relay sidelink component carrier information to the other UE 115 associated with the sidelink. For example, UE 115-*a* may receive component carrier information 215 from base station 105-*a* indicating a set of component carriers to be used for the sidelink between UE 115-*a* and UE 115-*b*. In some cases, the component carrier information 215 from base station 105-*a* may include an indication for UE 115-*a* to relay the component carrier information 215 to UE 115-*b*, or UE 115-*a* may otherwise determine to relay the information. Accordingly, UE 115-*a* may relay the component carrier information 215 to UE 115-*b*, where the component carrier information may activate and/or deactivate one or more component carriers to be used for the sidelink between UE 115-*a* and UE 115-*b*. UE 115-*a* may relay the component carrier information 215 via a PC5 message, such as a PC5 MAC-CE message. In some cases, UE 115-*a* may utilize a same or similar format used to activate and/or deactivate Uu SCells.

In some cases, a UE 115 may receive component carrier information via a serving device other than base station 105-*a*. For example, UE 115-*a* may be an anchor UE 115 (e.g., a hub UE 115) to UE 115-*c* (e.g., a leaf UE 115), where UE 115-*a* and UE 115-*c* may communicate over sidelink 210-*a*. In some cases, anchor UE 115-*a* may activate and/or deactivate sidelink component carriers for one or more leaf UEs 115. In some cases, UE 115-*a* may update a component carrier list of a leaf UE 115 on a UE-basis, a sidelink-basis, or both. For example, UE 115-*c* may originally be configured with a third set of component carriers to use for all sidelink communications and UE 115-*a* may determine to activate and/or deactivate one or more component carriers (e.g., updating on a UE-specific basis). In some cases, UE 115-*c* may be configured with a subset of component carrier of the third set to use for communicating over a particular sidelink and UE 115-*a* may determine to activate and/or deactivate one or more of the subset of component carriers (e.g., updating on a sidelink basis). An anchor UE 115 may autonomously determine to update a set or a subset of component carriers of a leaf UE 115. In some cases, base station 105-*a* may determine to update a set or a subset of component carriers of a leaf UE 115, may indicate the update to an anchor UE 115, and the anchor UE 115 may relay the update to the leaf UE 115.

Upon determining to update one or more component carriers in the set and/or the subset, UE 115-*a* may transmit a signal (e.g., a MAC-CE signal) indicating the update. If UE 115-*a* is updating the set of component carriers (e.g., not specific to a particular sidelink), then UE 115-*a* may not include a sidelink identifier in the signal. If UE 115-*a* is updating the subset of component carriers, UE 115-*a* may include a sidelink identifier in the signal to indicate which sidelink the updated component carriers are associated with.

FIGS. 3A and 3B illustrate examples of component carrier information formats 300, and 301, respectively that support techniques for configuring component carriers for sidelink communications in accordance with aspects of the present disclosure. In some cases, the component carrier information formats 300 and 301 may represent how a device may indicate component carrier information in a message. The component carrier information formats 300 and 301 may be implemented by a base station, or a UE, or both, which may be examples of a base station and UE as described with reference to FIGS. 1 and 2.

As described herein, such as with reference to FIG. 2, a UE may receive an indication of one or more component carriers to use for a particular sidelink (e.g., component carrier information 215). The UE may receive the indication from the other UE 115 associated with the particular sidelink, or from a serving device, such as a base station or anchor UE. The UE may receive the component carrier information in an RRC message (e.g., PC5 RRC message, Uu RRC message), or via a MAC-CE message (e.g., a Uu MAC-CE message).

In the case that the UE receives the component carrier information in an RRC message, the RRC message may include a sidelink identifier, and an indication of the sidelink component carriers. In some cases, the indication of the sidelink component carriers may be a component carrier index list. For example, a first UE (e.g., UE1) may receive a first component carrier information message for a sidelink between the first UE and a second UE (e.g., UE2). The message may indicate a sidelink identity (e.g., UE1-UE2 sidelink ID) and may include a list of component carriers that may be used for the sidelink (e.g., CC3, CC5, CC7). In some cases, the second UE may receive a second component carrier information message indicating a sidelink identity (e.g., UE1-UE2 sidelink ID) and a list of component carriers that may be used for the sidelink (e.g., CC2, CC4, CC6). Then, between the first UE and the second UE, the UEs 115 may use component carrier labels 1, 2, 3 instead of a CCId to identify the component carriers. For example, a first label may refer to CC3 for UE1 and CC2 for UE2. Similarly, a second label may refer to CC5 for UE1 and CC4 for UE2, and a third label may refer to CC7 for UE1 and to CC6 for UE2. Accordingly, even though the component carriers may be associated with different identifiers at different UEs, the UEs may determine which component carriers are the same across the UEs based on indexing.

In the case that the UE receives the component carrier information in a MAC-CE message, the MAC-CE message may indicate a sidelink identifier and a set of sidelink component carriers (e.g., a sidelink identifier may be added to the Uu MAC-CE format defined for activation and/or deactivation of Uu SCells to indicate the component carrier used for the sidelink). For example, with reference to FIG. 3A, a UE may receive a MAC-CE message including a sidelink identifier, and a set of component carriers (e.g., CC7, CC6, C5, CC4, CC3, CC2, CC1, and R, where R may refer to a common component carrier).

The set of component carriers depicted in FIG. 3A may fit into one octet of a MAC-CE message. However, in some cases, a set of component carriers may include more than eight component carriers. For example, in some cases, a UE may be configured with 32 component carriers (e.g., CC1 through CC31 and R). Accordingly, a UE may receive a MAC-CE message including multiple octets for indicating sidelink component carriers. To indicate how many component carriers, octets, or both are associated with a particular sidelink identifier, the MAC-CE message may include a length field, where the length field may indicate a number of component carriers, octets, or both associated with the particular sidelink identifier. As such, a UE may receive a MAC-CE message, identify a sidelink identifier and length field in the message, and based on the length field, the UE may identify how many component carrier and/or octets of component carriers are associated with the sidelink identifier.

In some cases, a UE may determine to communicate over multiple sidelinks. Accordingly, the UE may be configured with multiple sets of sidelink component carriers. In some cases, the UE may receive a message indicating each set of component carriers separately, or in some cases, may receive the multiple sets of component carriers in one message. For example, with reference to FIG. 3B, message formats may be stacked so as to indicate component carriers for multiple sidelinks in one message (e.g., stack MAC-CE formats). Accordingly, a UE may receive a message including a first sidelink identifier, a second sidelink identifier, and a third sidelink identifier. The message may indicate a first set of component carriers associated with the first sidelink identifier, a second set of component carriers associated with the second sidelink identifier, and a third set of component carriers associated with the third sidelink identifier. In some cases, the message may include a length field for each sidelink identifier to indicate a number of component carriers and/or octets associated with each sidelink identifier. For example, a first sidelink identifier may be associated with one octet, and a second sidelink identifier may be associated with four octets.

In some cases, one MAC-CE format may be defined to stack sidelink identifiers each associated with one octet, and another MAC-CE format may be defined to stack sidelink identifiers each associated with x octets, such as four octets. As such, to stack MAC-CE messages, the stacked messages should have the same format (e.g., the same number of octets). In such cases, the MAC-CE message may not include a length field for each sidelink identifier.

Figure 4:
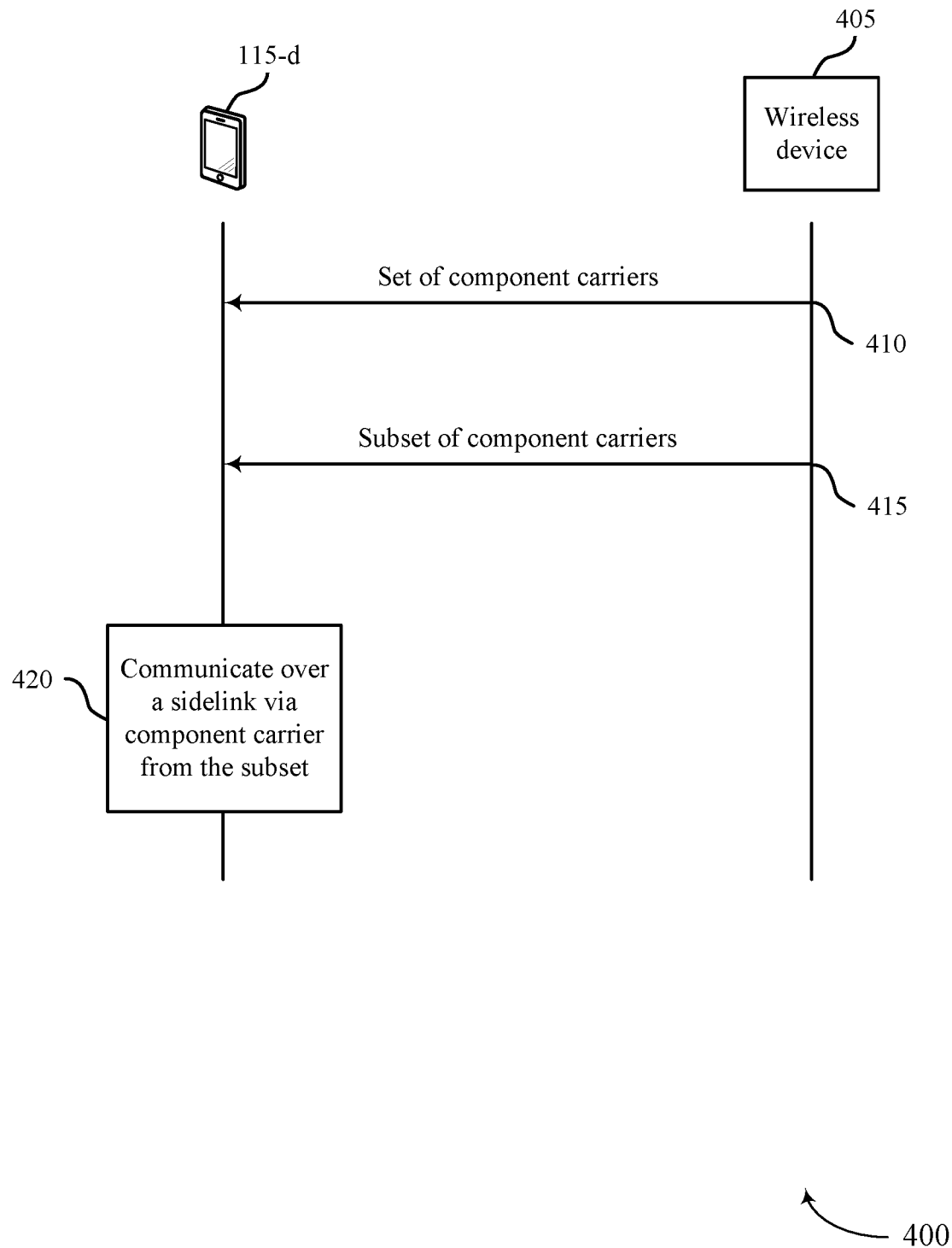
FIG. 4 illustrates an example of a process flow that supports techniques for configuring component carriers for sidelink communications in accordance with aspects of the present disclosure.

FIG. 4 illustrates an example of a process flow 400 that supports techniques for configuring component carriers for sidelink communications in accordance with aspects of the present disclosure. The process flow 400 may illustrate an example sidelink component carrier configuration procedure. For example, UE 115-d may receive component carrier information for performing sidelink communications with another UE 115. In some cases, UE 115-d may receive the component carrier information from a wireless device 405, where the wireless device 405 may be a base station, or a UE 115. UE 115-d and wireless device 405 may be examples of the corresponding wireless devices described with reference to FIGS. 1 through 3B. In some cases, UE 115-d may perform a component carrier determination procedure as described herein with multiple wireless devices, such as with one or more other UEs 115, a base station, or a combination thereof. Alternative examples of the following may be implemented, where some steps are performed in a different order than described or are not performed at all. In some cases, steps may include additional features not mentioned below, or further steps may be added.

The techniques described herein allow for configuring a UE 115, such as UE 115-d, with one or more component carriers for a particular sidelink. UE 115-d may be configured with a set of component carriers by a wireless device 405 (e.g., a base station, or anchor UE 115). UE 115-d may then determine to communicate with a second UE 115 and may determine a common component carrier between the two UEs 115, where UE 115-d may perform such determination with the second UE 115, with an anchor UE 115, with a base station 105, or a combination thereof. Upon determining (or being configured with) a common component carrier, UE 115-d may communicate with the second UE 115 via the common component carrier.

For example, at 410, UE 115-d may receive control signaling indicating a set of component carriers allocated for sidelink communications performed by UE 115-d. Receiving the control signaling indicating the set of component carriers may include receiving, from the wireless device (e.g., a base station, an anchor UE 115), a radio resource control message, or a medium access control (MAC) control element (MAC-CE) message indicating the set of component carriers.

In some cases, the wireless device 405 may determine to update the set of component carriers for UE 115-d, and the wireless device 405 may transmit the control signaling indicating the set of component carriers based at least in part on the determination.

At 415, UE 115-d may receive a message indicating a subset of component carriers from the set of component carriers for use in communicating via a sidelink between UE 115-d and a second UE 115. The subset of component carriers may be supported by UE 115-d and the other UE 115. Receiving the message indicating the subset of component carriers may include receiving the message indicating multiple subsets of component carriers and a sidelink identifier associated with each of the multiple subsets of component carriers, where each sidelink identifier may be indicative of a different sidelink. Receiving the message indicating the subset of component carriers may include receiving the message including a length field, the length field indicating a number of component carriers, a number of octets, or a combination thereof associated with each sidelink identifier.

In some cases, UE 115-d may determine to communicate with a second UE 115 via a sidelink, and may transmit, to a wireless device 405 (e.g., a base station, an anchor UE 115), a signal including information associated with the sidelink between UE 115-d and the second UE 115. The information may include a destination identifier associated with the second UE 115 and the sidelink. Receiving the message indicating the subset of component carriers may include receiving, from the wireless device 405 (e.g., a base station, an anchor UE 115), the message indicating the subset of component carriers based on the transmitted signal.

In some cases, receiving the message indicating the subset of component carriers may include receiving the message comprising a sidelink identifier, where the sidelink identifier may indicate the sidelink over which the subset of component carriers are to be used. Receiving the message indicating the subset of component carriers may include receiving a radio resource control signal, or a medium access control (MAC) control element (MAC-CE) signal including the message.

In some implementations, UE 115-d may transmit, to the second UE 115, an indication of the set of component carriers allocated to UE 115-d for the sidelink communications. UE 115-d may perform a common component carrier determination procedure with the second UE 115 to determine the subset of component carriers that are supported by UE 115-d and the second UE 115 based on transmitting the indication to the second UE 115. The indication of the set of component carriers may include a frequency identifier, a frequency reference point, a bandwidth, a subcarrier spacing, an offset, a bandwidth part, or a combination thereof associated with each component carrier of the set of component carriers. UE 115-*d* may receive, from the second UE 115, a request for information associated with the subset of component carriers based at least in part on the transmitted indication of the set of component carriers by UE 115-*d*.

In some cases, transmitting the indication to the second UE 115 may include transmitting the indication via the component carrier supported by UE 115-*d* and the second UE 115, where the component carrier was indicated to at least UE 115-*d* by the wireless device 405 (e.g., a base station, an anchor UE 115). In some cases, transmitting the indication to the second UE 115 may include transmitting the indication via a sidelink radio resource control message.

Receiving the message indicating the subset of component carriers may include receiving, from the second UE 115, the message indicating the subset of component carriers, where the second UE 115 is an anchor UE to UE 115-*d*. In some cases, receiving the control signaling indicating the set of component carriers may include receiving, from the second UE 115, the message indicating the set of component carriers, where the second UE 115 is an anchor UE 115 to UE 115-*d*.

In some implementations, the wireless device 405 may determine to update the subset of component carriers for UE 115-*d* and the second UE 115, and accordingly, may transmit the message indicating the subset of component carriers based at least in part on the determination.

In some cases, the wireless device 405 may transmit, to the second UE 115, a message indicating the subset of component carriers for the second UE 115 to use in communicating via the sidelink between UE 115-*d* and the second UE 115.

At 420, UE 115-*d* may communicate with the second UE 115 via a component carrier from the subset of component carriers.

Figure 5:
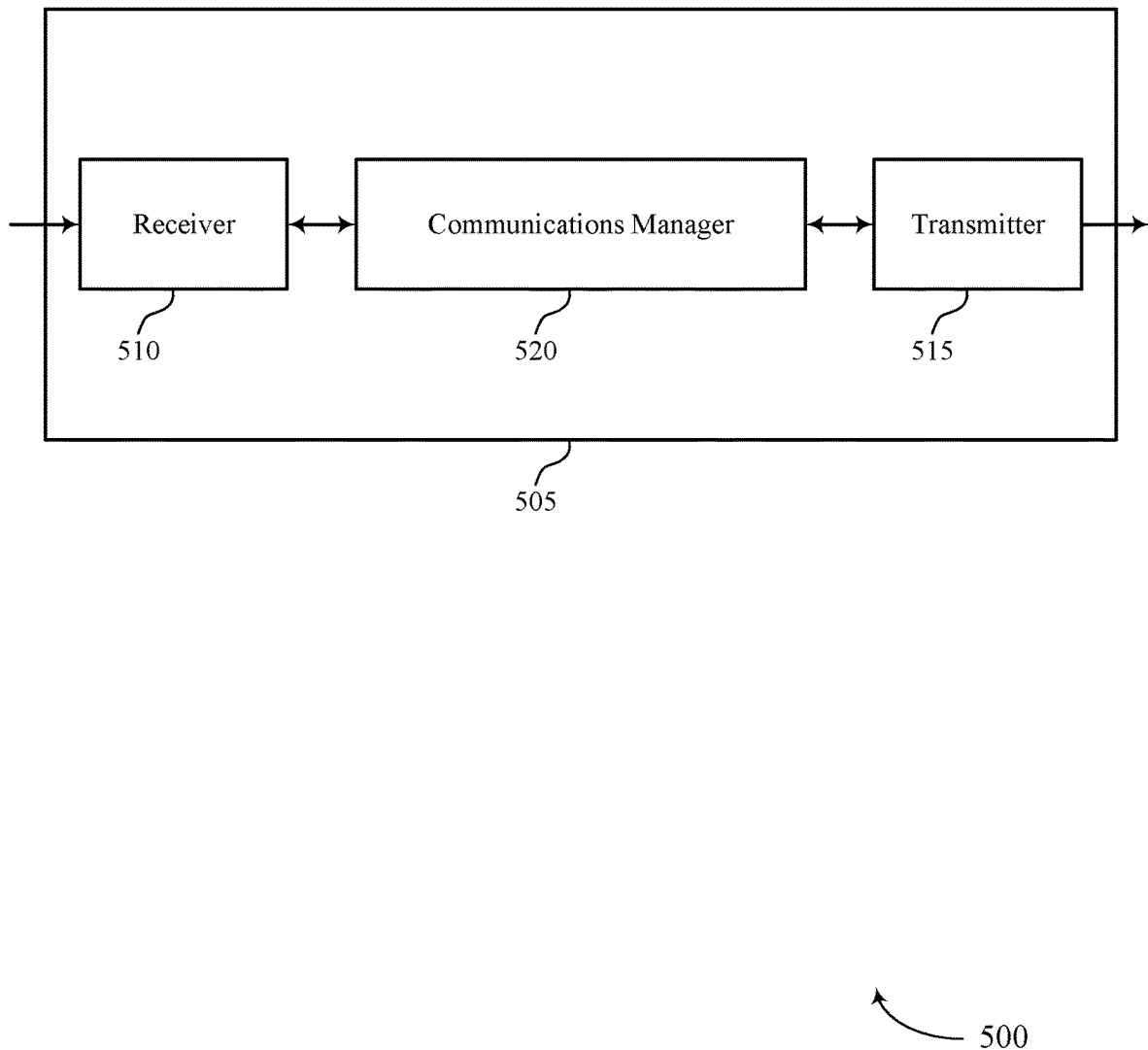
FIGS. 5 and 6 show block diagrams of devices that support techniques for configuring component carriers for sidelink communications in accordance with aspects of the present disclosure.

FIG. 5 shows a block diagram 500 of a device 505 that supports techniques for configuring component carriers for sidelink communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for configuring component carriers for sidelink communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for configuring component carriers for sidelink communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for configuring component carriers for sidelink communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for receiving control signaling indicating a set of component carriers allocated for sidelink communications performed by the first UE. The communications manager 520 may be configured as or otherwise support a means for receiving a message indicating a subset of component carriers from the set of component carriers for use in communicating via a sidelink between the first UE and a second UE, where the subset of component carriers are supported by the first UE and the second UE. The communications manager 520 may be configured as or otherwise support a means for communicating with the second UE via a component carrier from the subset of component carriers.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources.

Figure 6:
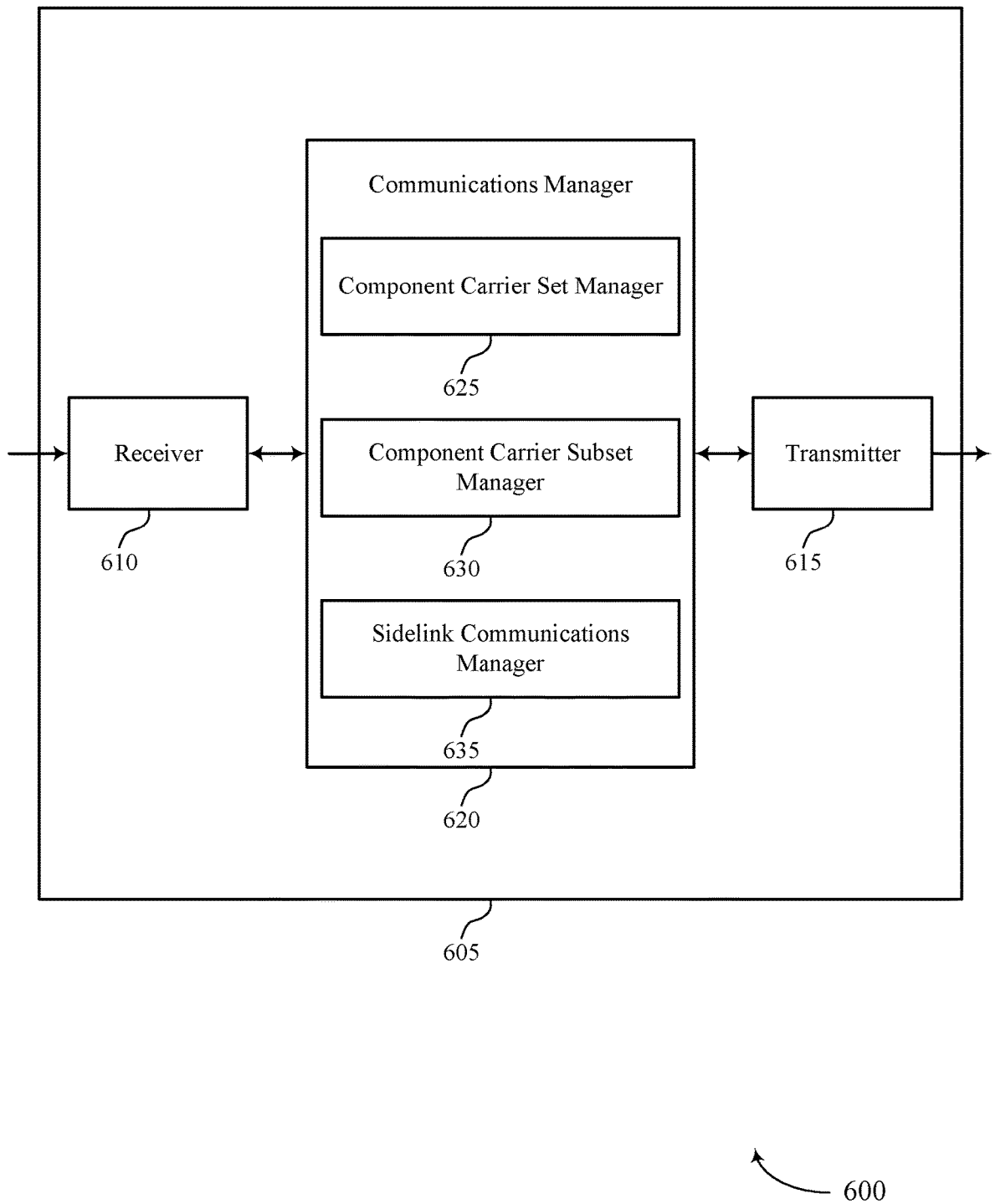

FIG. 6 shows a block diagram 600 of a device 605 that supports techniques for configuring component carriers for sidelink communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for configuring component carriers for sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for configuring component carriers for sidelink communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for configuring component carriers for sidelink communications as described herein. For example, the communications manager 620 may include a component carrier set manager 625, a component carrier subset manager 630, a sidelink communications manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The component carrier set manager 625 may be configured as or otherwise support a means for receiving control signaling indicating a set of component carriers allocated for sidelink communications performed by the first UE. The component carrier subset manager 630 may be configured as or otherwise support a means for receiving a message indicating a subset of component carriers from the set of component carriers for use in communicating via a sidelink between the first UE and a second UE, where the subset of component carriers are supported by the first UE and the second UE. The sidelink communications manager 635 may be configured as or otherwise support a means for communicating with the second UE via a component carrier from the subset of component carriers.

Figure 7:
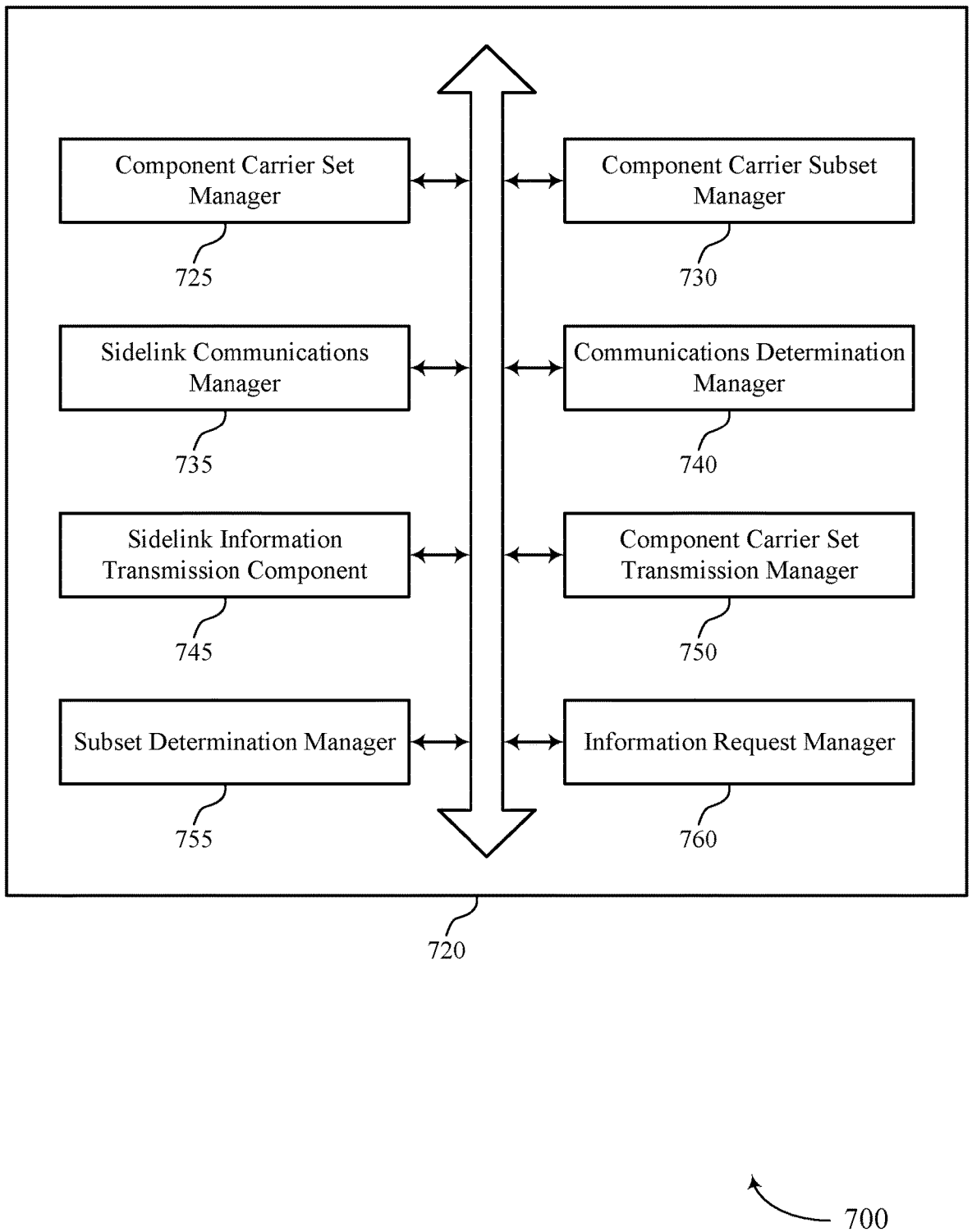
FIG. 7 shows a block diagram of a communications manager that supports techniques for configuring component carriers for sidelink communications in accordance with aspects of the present disclosure.

FIG. 7 shows a block diagram 700 of a communications manager 720 that supports techniques for configuring component carriers for sidelink communications in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for configuring component carriers for sidelink communications as described herein. For example, the communications manager 720 may include a component carrier set manager 725, a component carrier subset manager 730, a sidelink communications manager 735, a communications determination manager 740, a sidelink information transmission component 745, a component carrier set transmission manager 750, a subset determination manager 755, an information request manager 760, or any combination thereof. Each of these components may communicate, directly or indirectly, with one another (e.g., via one or more buses).

The communications manager 720 may support wireless communications at a first UE in accordance with examples as disclosed herein. The component carrier set manager 725 may be configured as or otherwise support a means for receiving control signaling indicating a set of component carriers allocated for sidelink communications performed by the first UE. The component carrier subset manager 730 may be configured as or otherwise support a means for receiving a message indicating a subset of component carriers from the set of component carriers for use in communicating via a sidelink between the first UE and a second UE, where the subset of component carriers are supported by the first UE and the second UE. The sidelink communications manager 735 may be configured as or otherwise support a means for communicating with the second UE via a component carrier from the subset of component carriers.

In some examples, the communications determination manager 740 may be configured as or otherwise support a means for determining to communicate with the second UE via the sidelink. In some examples, the sidelink information transmission component 745 may be configured as or otherwise support a means for transmitting, to a base station, a signal including information associated with the sidelink between the first UE and the second UE.

In some examples, the information includes a destination identifier associated with the second UE and the sidelink.

In some examples, to support receiving the message indicating the subset of component carriers, the component carrier subset manager 730 may be configured as or otherwise support a means for receiving, from the base station, the message indicating the subset of component carriers based on the transmitted signal.

In some examples, to support receiving the message indicating the subset of component carriers, the component carrier subset manager 730 may be configured as or otherwise support a means for receiving the message including a sidelink identifier, where the sidelink identifier indicates the sidelink over which the subset of component carriers are to be used.

In some examples, to support receiving the message indicating the subset of component carriers, the component carrier subset manager 730 may be configured as or otherwise support a means for receiving a radio resource control signal, or a medium access control (MAC) control element (MAC-CE) signal including the message.

In some examples, the component carrier set transmission manager 750 may be configured as or otherwise support a means for transmitting, to the second UE, an indication of the set of component carriers allocated to the first UE for the sidelink communications.

In some examples, to support receiving the message indicating the subset of component carriers, the subset determination manager 755 may be configured as or otherwise support a means for performing a common component carrier determination procedure with the second UE to determine the subset of component carriers that are supported by the first UE and the second UE based on transmitting the indication to the second UE.

In some examples, the indication of the set of component carriers includes a frequency identifier, a frequency reference point, a bandwidth, a subcarrier spacing, an offset, a bandwidth part, or a combination thereof associated with each component carrier of the set of component carriers.

In some examples, the information request manager 760 may be configured as or otherwise support a means for receiving, from the second UE, a request for information associated with the subset of component carriers based on the transmitted indication of the set of component carriers by the first UE.

In some examples, to support transmitting the indication to the second UE, the component carrier set transmission manager 750 may be configured as or otherwise support a means for transmitting the indication via the component carrier supported by the first UE and the second UE, where the component carrier was indicated to at least the first UE by a base station.

In some examples, to support transmitting the indication to the second UE, the component carrier set transmission manager 750 may be configured as or otherwise support a means for transmitting the indication via a sidelink radio resource control message.

In some examples, to support receiving the message indicating the subset of component carriers, the component carrier subset manager 730 may be configured as or otherwise support a means for receiving the message indicating multiple subsets of component carriers and a sidelink identifier associated with each of the multiple subsets of component carriers, where each sidelink identifier is indicative of a different sidelink.

In some examples, to support receiving the message indicating the subset of component carriers, the component carrier subset manager 730 may be configured as or otherwise support a means for receiving the message including a length field, the length field indicating a number of component carriers, a number of octets, or a combination thereof associated with each sidelink identifier.

In some examples, to support receiving the control signaling indicating the set of component carriers, the component carrier set manager 725 may be configured as or otherwise support a means for receiving, from a base station, a radio resource control message, or a medium access control (MAC) control element (MAC-CE) message indicating the set of component carriers.

In some examples, to support receiving the message indicating the subset of component carriers, the component carrier subset manager 730 may be configured as or otherwise support a means for receiving, from the second UE, the message indicating the subset of component carriers, where the second UE is an anchor UE to the first UE.

In some examples, to support receiving the control signaling indicating the set of component carriers, the component carrier set manager 725 may be configured as or otherwise support a means for receiving, from the second UE, the message indicating the set of component carriers, where the second UE is an anchor UE to the first UE.

Figure 8:
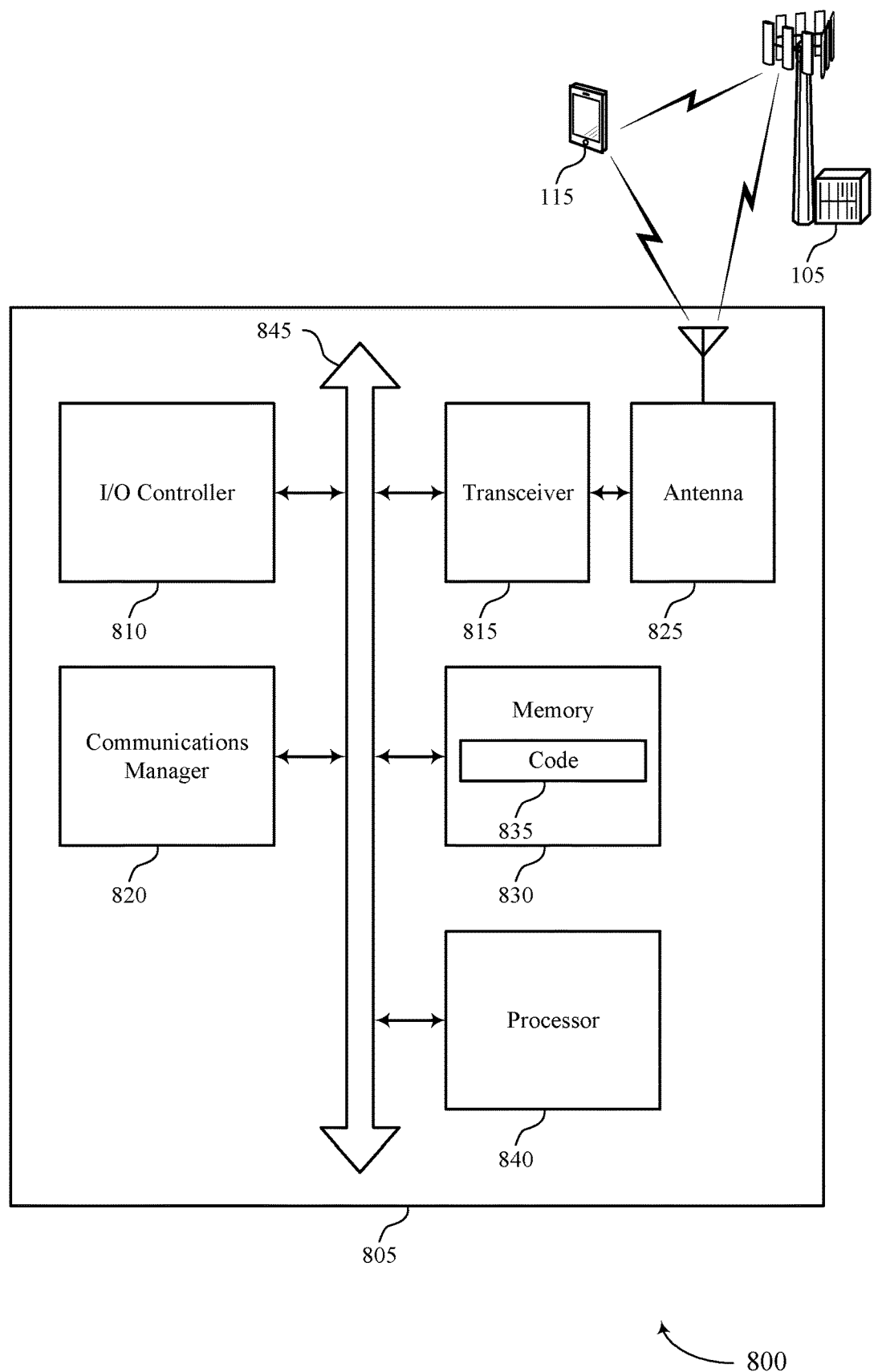
FIG. 8 shows a diagram of a system including a device that supports techniques for configuring component carriers for sidelink communications in accordance with aspects of the present disclosure.

FIG. 8 shows a diagram of a system 800 including a device 805 that supports techniques for configuring component carriers for sidelink communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for configuring component carriers for sidelink communications). For example, the device 805 or a component of the device 805 may include a processor 840 and memory 830 coupled to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for receiving control signaling indicating a set of component carriers allocated for sidelink communications performed by the first UE. The communications manager 820 may be configured as or otherwise support a means for receiving a message indicating a subset of component carriers from the set of component carriers for use in communicating via a sidelink between the first UE and a second UE, where the subset of component carriers are supported by the first UE and the second UE. The communications manager 820 may be configured as or otherwise support a means for communicating with the second UE via a component carrier from the subset of component carriers.

By including or configuring the communications manager 820 in accordance with examples as described herein, the device 805 may support techniques for more efficient utilization of communication resources, improved coordination between devices, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for configuring component carriers for sidelink communications as described herein, or the processor 840 and the memory 830 may be otherwise configured to perform or support such operations.

Figure 9:
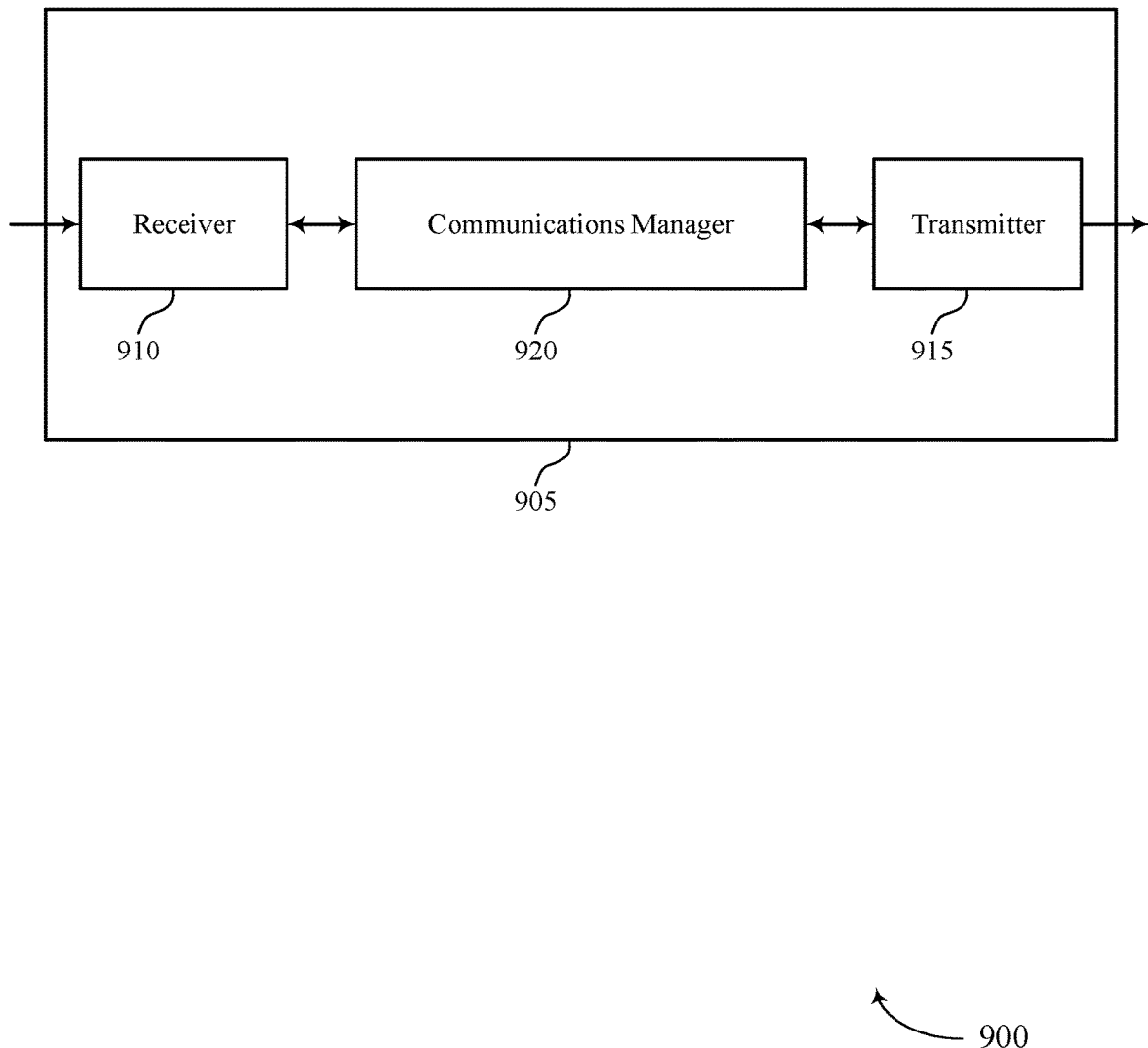
FIGS. 9 and 10 show block diagrams of devices that support techniques for configuring component carriers for sidelink communications in accordance with aspects of the present disclosure.

FIG. 9 shows a block diagram 900 of a device 905 that supports techniques for configuring component carriers for sidelink communications in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for configuring component carriers for sidelink communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for configuring component carriers for sidelink communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for configuring component carriers for sidelink communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a first UE, control signaling indicating a set of component carriers allocated for sidelink communications for use by the first UE. The communications manager 920 may be configured as or otherwise support a means for transmitting a message indicating a subset of component carriers from the set of component carriers for the first UE to use in communicating via a sidelink between the first UE and a second UE, where the subset of component carriers are supported by the first UE and the second UE.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources.

Figure 10:
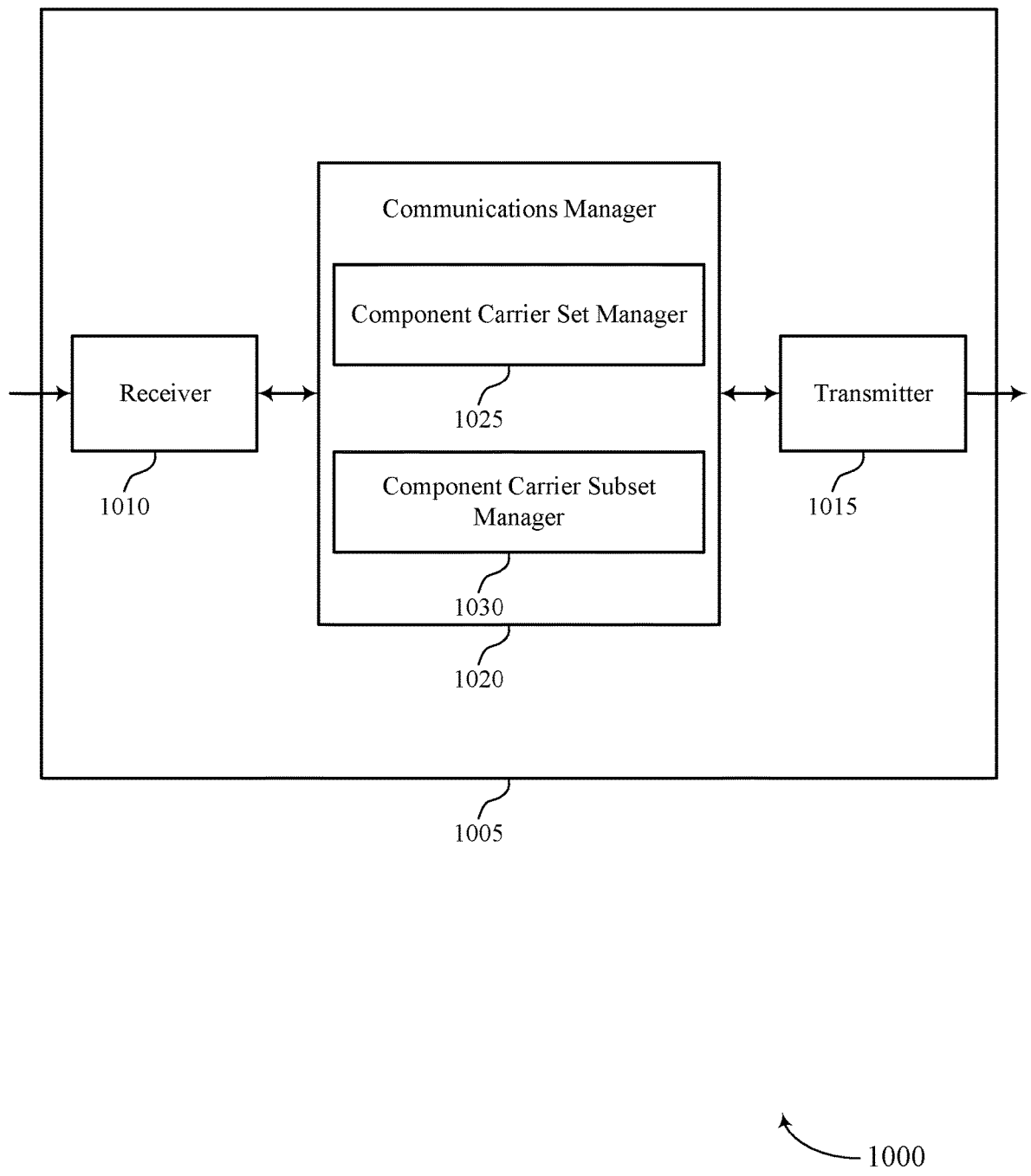

FIG. 10 shows a block diagram 1000 of a device 1005 that supports techniques for configuring component carriers for sidelink communications in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for configuring component carriers for sidelink communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for configuring component carriers for sidelink communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for configuring component carriers for sidelink communications as described herein. For example, the communications manager 1020 may include a component carrier set manager 1025 a component carrier subset manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The component carrier set manager 1025 may be configured as or otherwise support a means for transmitting, to a first UE, control signaling indicating a set of component carriers allocated for sidelink communications for use by the first UE. The component carrier subset manager 1030 may be configured as or otherwise support a means for transmitting a message indicating a subset of component carriers from the set of component carriers for the first UE to use in communicating via a sidelink between the first UE and a second UE, where the subset of component carriers are supported by the first UE and the second UE.

Figure 11:
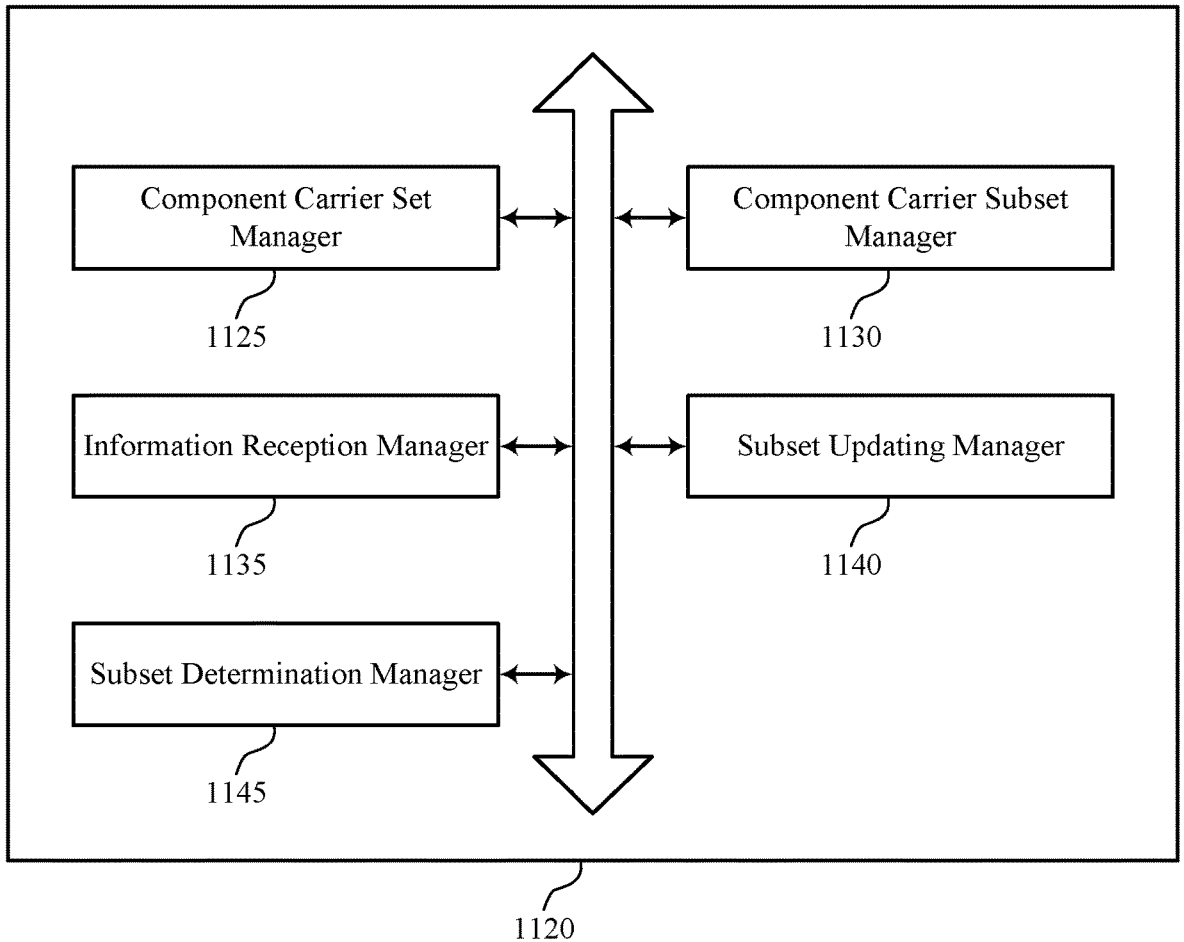
FIG. 11 shows a block diagram of a communications manager that supports techniques for configuring component carriers for sidelink communications in accordance with aspects of the present disclosure.

FIG. 11 shows a block diagram 1100 of a communications manager 1120 that supports techniques for configuring component carriers for sidelink communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for configuring component carriers for sidelink communications as described herein. For example, the communications manager 1120 may include a component carrier set manager 1125, a component carrier subset manager 1130, an information reception manager 1135, a subset updating manager 1140, a subset determination manager 1145, or any combination thereof. Each of these components may communicate, directly or indirectly, with one another (e.g., via one or more buses).

The communications manager 1120 may support wireless communications at a base station in accordance with examples as disclosed herein. The component carrier set manager 1125 may be configured as or otherwise support a means for transmitting, to a first UE, control signaling indicating a set of component carriers allocated for sidelink communications for use by the first UE. The component carrier subset manager 1130 may be configured as or otherwise support a means for transmitting a message indicating a subset of component carriers from the set of component carriers for the first UE to use in communicating via a sidelink between the first UE and a second UE, where the subset of component carriers are supported by the first UE and the second UE.

In some examples, the information reception manager 1135 may be configured as or otherwise support a means for receiving, from the first UE, the second UE, or both, a signal including information associated with the sidelink between the first UE and the second UE.

In some examples, the information includes a destination identifier associated with the second UE and the sidelink.

In some examples, the subset determination manager 1145 may be configured as or otherwise support a means for determining the subset of component carriers that are common between the first UE and the second UE based on the received signal, where transmitting the message indicating the subset of component carriers is based on the determination.

In some examples, to support transmitting the message indicating the subset of component carriers, the component carrier subset manager 1130 may be configured as or otherwise support a means for transmitting the message including a sidelink identifier, where the sidelink identifier indicates the sidelink over which the subset of component carriers are to be used by the first UE.

In some examples, to support transmitting the message indicating the subset of component carriers, the component carrier subset manager 1130 may be configured as or otherwise support a means for transmitting a radio resource control signal, or a medium access control (MAC) control element (MAC-CE) signal including the message.

In some examples, to support transmitting the message indicating the subset of component carriers, the component carrier subset manager 1130 may be configured as or otherwise support a means for transmitting the message indicating multiple subsets of component carriers and a sidelink identifier associated with each of the multiple subsets of component carriers, where each sidelink identifier is indicative of a different sidelink of the first UE.

In some examples, to support transmitting the message indicating the subset of component carriers, the component carrier subset manager 1130 may be configured as or otherwise support a means for transmitting the message including a length field, the length field indicating a number of component carriers, a number of octets, or a combination thereof associated with each sidelink identifier.

In some examples, the component carrier subset manager 1130 may be configured as or otherwise support a means for transmitting, to the second UE, the message indicating the subset of component carriers for the second UE to use in communicating via the sidelink between the first UE and the second UE.

In some examples, the subset updating manager 1140 may be configured as or otherwise support a means for determining to update the subset of component carriers for the first UE and the second UE, where transmitting the message indicating the subset of component carriers is based on the determination.

In some examples, the subset updating manager 1140 may be configured as or otherwise support a means for determining to update the set of component carriers for the first UE, where transmitting the control signaling indicating the set of component carriers is based on the determination.

Figure 12:
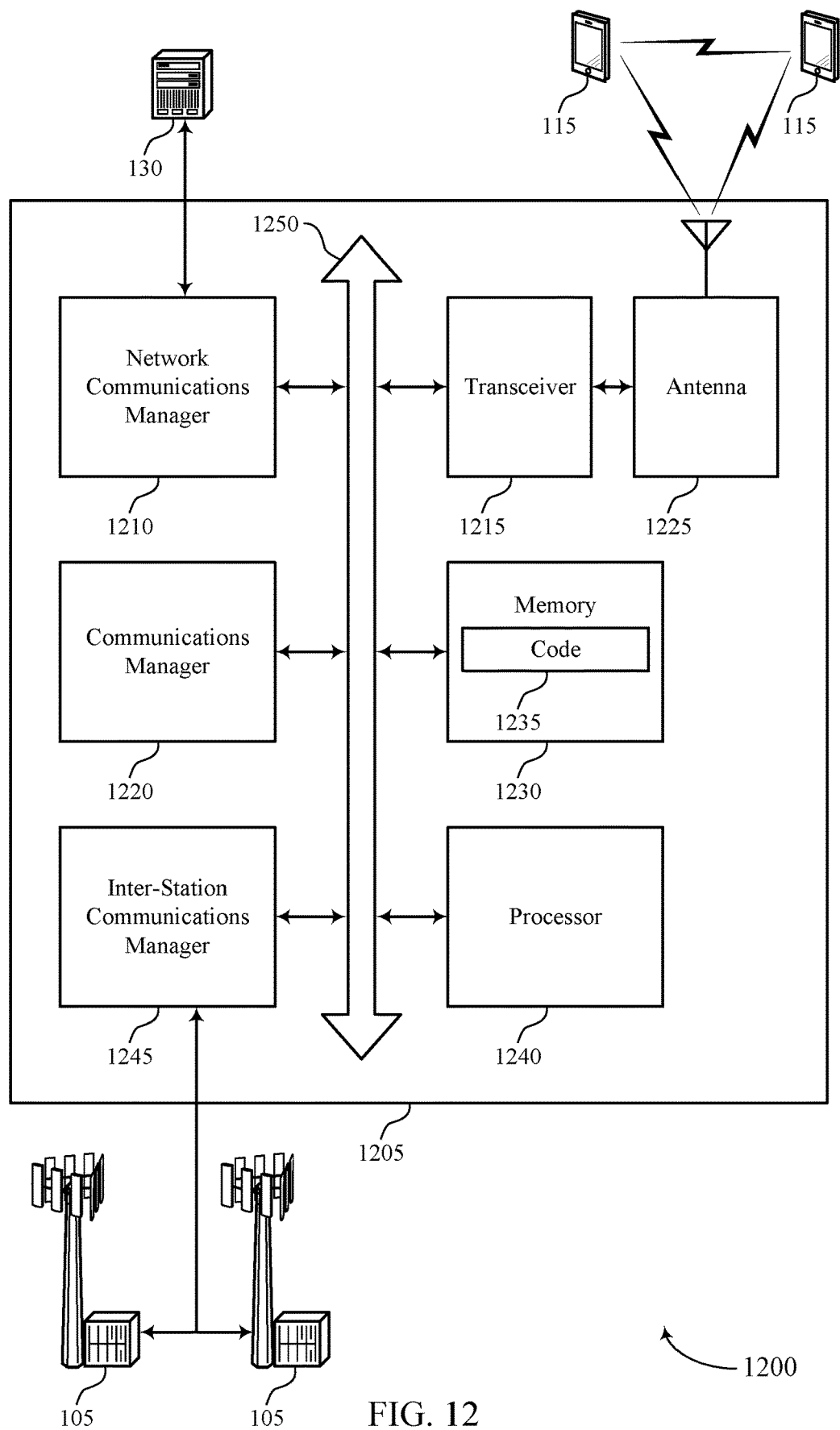
FIG. 12 shows a diagram of a system including a device that supports techniques for configuring component carriers for sidelink communications in accordance with aspects of the present disclosure.

FIG. 12 shows a diagram of a system 1200 including a device 1205 that supports techniques for configuring component carriers for sidelink communications in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for configuring component carriers for sidelink communications). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a first UE, control signaling indicating a set of component carriers allocated for sidelink communications for use by the first UE. The communications manager 1220 may be configured as or otherwise support a means for transmitting a message indicating a subset of component carriers from the set of component carriers for the first UE to use in communicating via a sidelink between the first UE and a second UE, where the subset of component carriers are supported by the first UE and the second UE.

By including or configuring the communications manager 1220 in accordance with examples as described herein, the device 1205 may support techniques for more efficient utilization of communication resources, improved coordination between devices, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for configuring component carriers for sidelink communications as described herein, or the processor 1240 and the memory 1230 may be otherwise configured to perform or support such operations.

Figure 13:
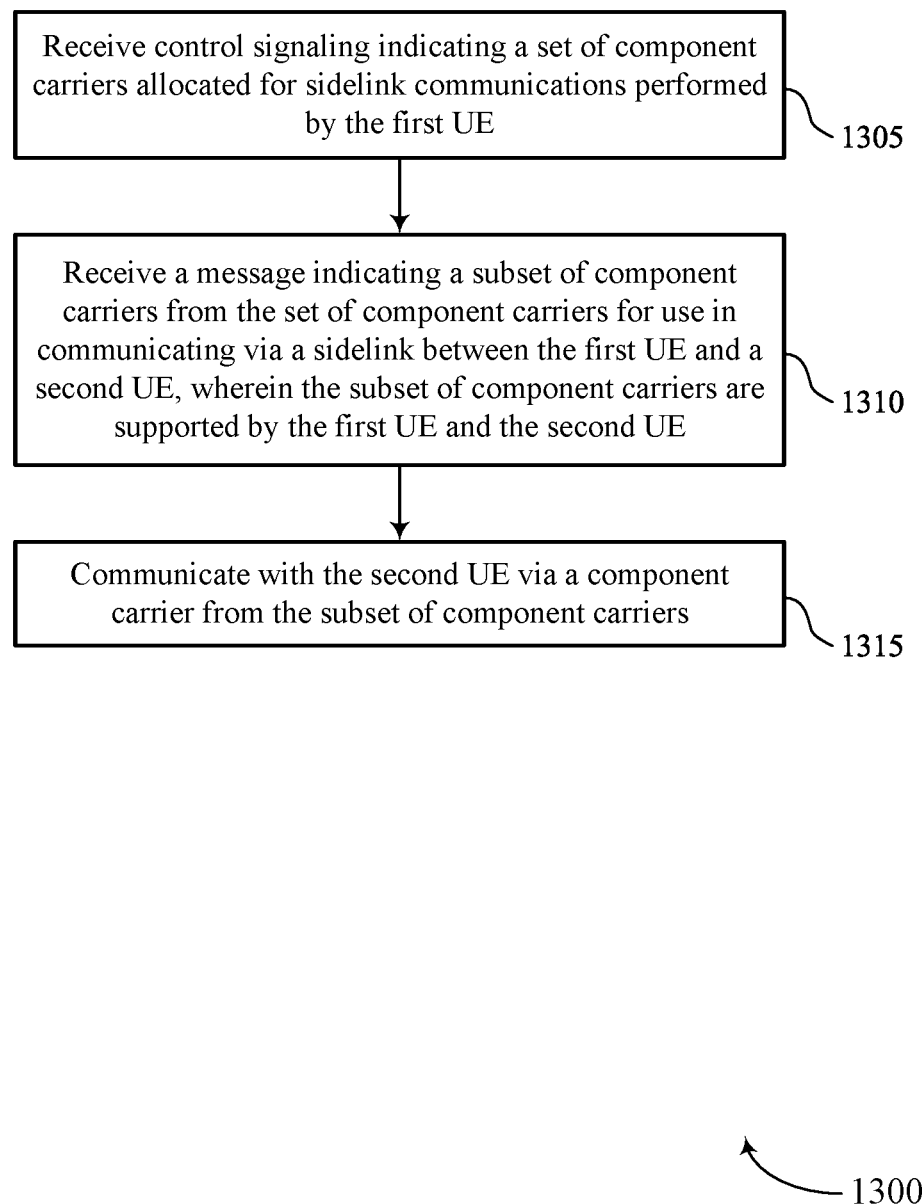
FIGS. 13 through 16 show flowcharts illustrating methods that support techniques for configuring component carriers for sidelink communications in accordance with aspects of the present disclosure.

FIG. 13 shows a flowchart illustrating a method 1300 that supports techniques for configuring component carriers for sidelink communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating a set of component carriers allocated for sidelink communications performed by the first UE. The operations of 1305 may be performed in accordance with examples as disclosed herein. In some examples, aspects of the operations of 1305 may be performed by a component carrier set manager 725 as described with reference to FIG. 7.

At 1310, the method may include receiving a message indicating a subset of component carriers from the set of component carriers for use in communicating via a sidelink between the first UE and a second UE, where the subset of component carriers are supported by the first UE and the second UE. The operations of 1310 may be performed in accordance with examples as disclosed herein. In some examples, aspects of the operations of 1310 may be performed by a component carrier subset manager 730 as described with reference to FIG. 7.

At 1315, the method may include communicating with the second UE via a component carrier from the subset of component carriers. The operations of 1315 may be performed in accordance with examples as disclosed herein. In some examples, aspects of the operations of 1315 may be performed by a sidelink communications manager 735 as described with reference to FIG. 7.

Figure 14:
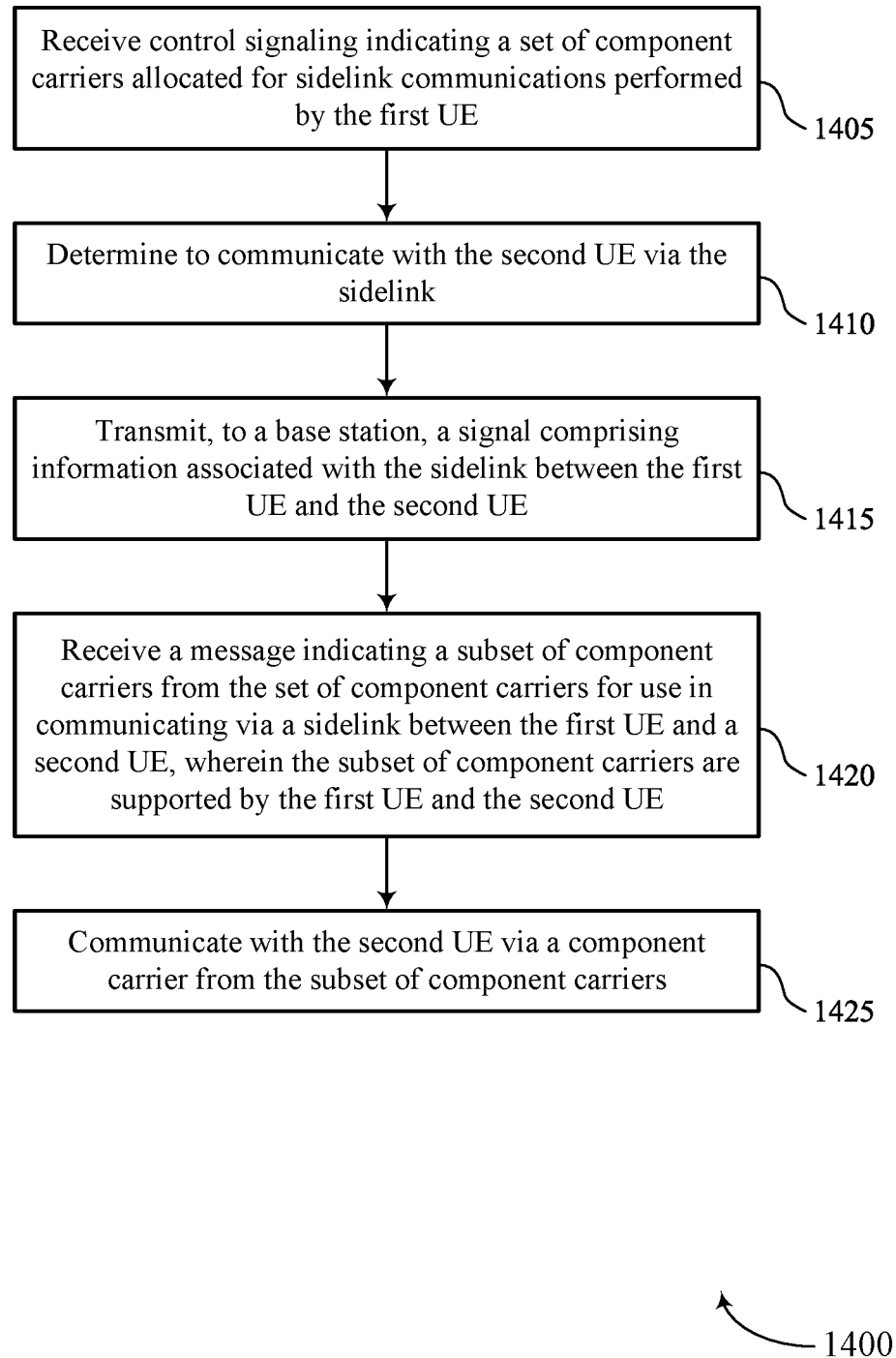

FIG. 14 shows a flowchart illustrating a method 1400 that supports techniques for configuring component carriers for sidelink communications in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving control signaling indicating a set of component carriers allocated for sidelink communications performed by the first UE. The operations of 1405 may be performed in accordance with examples as disclosed herein. In some examples, aspects of the operations of 1405 may be performed by a component carrier set manager 725 as described with reference to FIG. 7.

At 1410, the method may include determining to communicate with the second UE via the sidelink. The operations of 1410 may be performed in accordance with examples as disclosed herein. In some examples, aspects of the operations of 1410 may be performed by a communications determination manager 740 as described with reference to FIG. 7.

At 1415, the method may include transmitting, to a base station, a signal including information associated with the sidelink between the first UE and the second UE. The operations of 1415 may be performed in accordance with examples as disclosed herein. In some examples, aspects of the operations of 1415 may be performed by a sidelink information transmission component 745 as described with reference to FIG. 7.

At 1420, the method may include receiving a message indicating a subset of component carriers from the set of component carriers for use in communicating via a sidelink between the first UE and a second UE, where the subset of component carriers are supported by the first UE and the second UE. The operations of 1420 may be performed in accordance with examples as disclosed herein. In some examples, aspects of the operations of 1420 may be performed by a component carrier subset manager 730 as described with reference to FIG. 7.

At 1425, the method may include communicating with the second UE via a component carrier from the subset of component carriers. The operations of 1425 may be performed in accordance with examples as disclosed herein. In some examples, aspects of the operations of 1425 may be performed by a sidelink communications manager 735 as described with reference to FIG. 7.

Figure 15:
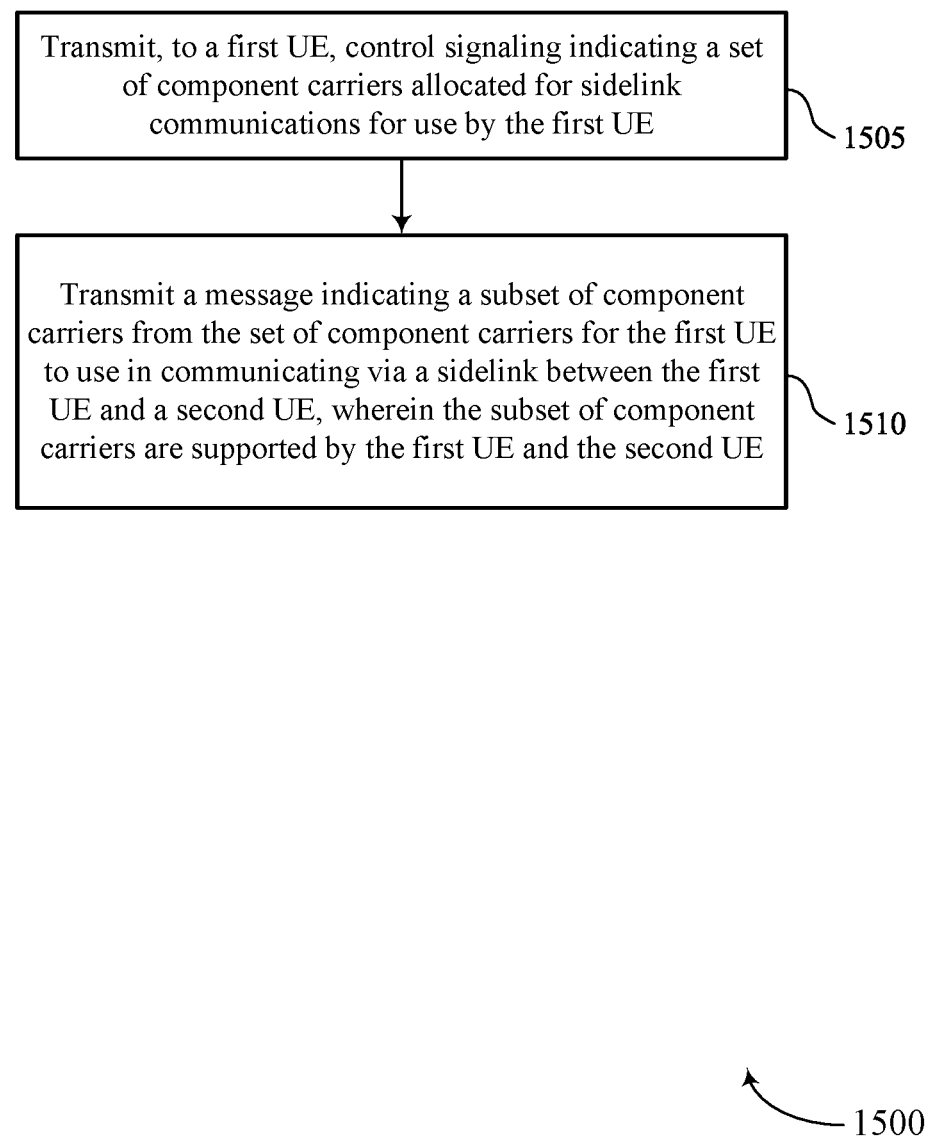

FIG. 15 shows a flowchart illustrating a method 1500 that supports techniques for configuring component carriers for sidelink communications in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a first UE, control signaling indicating a set of component carriers allocated for sidelink communications for use by the first UE. The operations of 1505 may be performed in accordance with examples as disclosed herein. In some examples, aspects of the operations of 1505 may be performed by a component carrier set manager 1125 as described with reference to FIG. 11.

At 1510, the method may include transmitting a message indicating a subset of component carriers from the set of component carriers for the first UE to use in communicating via a sidelink between the first UE and a second UE, where the subset of component carriers are supported by the first UE and the second UE. The operations of 1510 may be performed in accordance with examples as disclosed herein. In some examples, aspects of the operations of 1510 may be performed by a component carrier subset manager 1130 as described with reference to FIG. 11.

Figure 16:
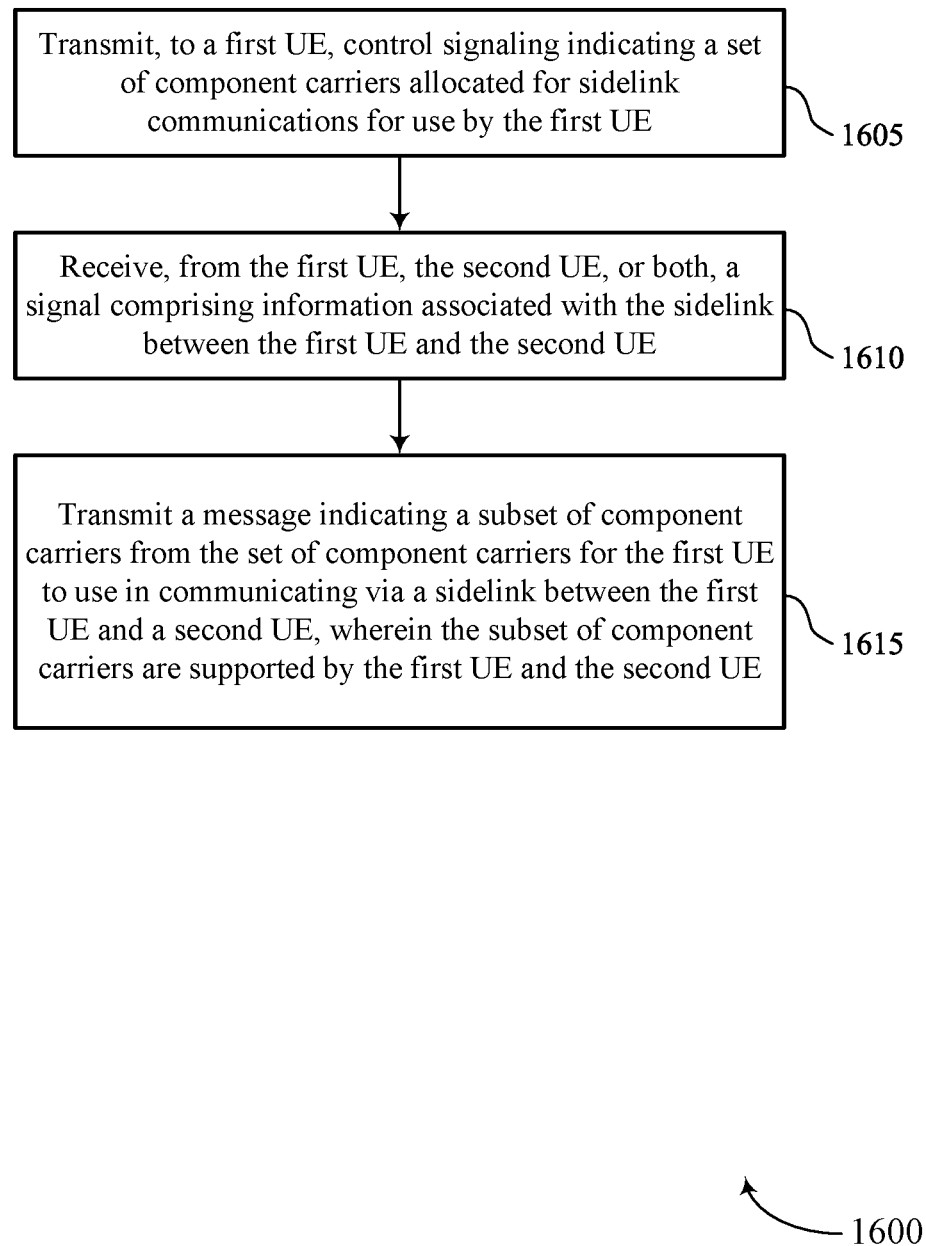

FIG. 16 shows a flowchart illustrating a method 1600 that supports techniques for configuring component carriers for sidelink communications in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a first UE, control signaling indicating a set of component carriers allocated for sidelink communications for use by the first UE. The operations of 1605 may be performed in accordance with examples as disclosed herein. In some examples, aspects of the operations of 1605 may be performed by a component carrier set manager 1125 as described with reference to FIG. 11.

At 1610, the method may include receiving, from the first UE, the second UE, or both, a signal including information associated with the sidelink between the first UE and the second UE. The operations of 1610 may be performed in accordance with examples as disclosed herein. In some examples, aspects of the operations of 1610 may be performed by an information reception manager 1135 as described with reference to FIG. 11.

At 1615, the method may include transmitting a message indicating a subset of component carriers from the set of component carriers for the first UE to use in communicating via a sidelink between the first UE and a second UE, where the subset of component carriers are supported by the first UE and the second UE. The operations of 1615 may be performed in accordance with examples as disclosed herein. In some examples, aspects of the operations of 1615 may be performed by a component carrier subset manager 1130 as described with reference to FIG. 11.

The following provides an overview of aspects of the present disclosure:

Aspect 1: A method for wireless communications at a first UE, comprising: receiving control signaling indicating a set of component carriers allocated for sidelink communications performed by the first UE; receiving a message indicating a subset of component carriers from the set of component carriers for use in communicating via a sidelink between the first UE and a second UE, wherein the subset of component carriers are supported by the first UE and the second UE; and communicating with the second UE via a component carrier from the subset of component carriers.

Aspect 2: The method of aspect 1, further comprising: determining to communicate with the second UE via the sidelink; and transmitting, to a base station, a signal comprising information associated with the sidelink between the first UE and the second UE.

Aspect 3: The method of aspect 2, wherein the information comprises a destination identifier associated with the second UE and the sidelink.

Aspect 4: The method of any of aspects 2 through 3, wherein receiving the message indicating the subset of component carriers further comprises: receiving, from the base station, the message indicating the subset of component carriers based at least in part on the transmitted signal.

Aspect 5: The method of any of aspects 1 through 4, wherein receiving the message indicating the subset of component carriers further comprises: receiving the message comprising a sidelink identifier, wherein the sidelink identifier indicates the sidelink over which the subset of component carriers are to be used.

Aspect 6: The method of any of aspects 1 through 5, wherein receiving the message indicating the subset of component carriers further comprises: receiving a radio resource control signal, or a medium access control (MAC) control element (MAC-CE) signal comprising the message.

Aspect 7: The method of any of aspects 1 through 6, further comprising: transmitting, to the second UE, an indication of the set of component carriers allocated to the first UE for the sidelink communications.

Aspect 8: The method of aspect 7, wherein receiving the message indicating the subset of component carriers further comprises: performing a common component carrier determination procedure with the second UE to determine the subset of component carriers that are supported by the first UE and the second UE based at least in part on transmitting the indication to the second UE.

Aspect 9: The method of any of aspects 7 through 8, wherein the indication of the set of component carriers comprises a frequency identifier, a frequency reference point, a bandwidth, a subcarrier spacing, an offset, a bandwidth part, or a combination thereof associated with each component carrier of the set of component carriers.

Aspect 10: The method of any of aspects 7 through 9, further comprising: receiving, from the second UE, a request for information associated with the subset of component carriers based at least in part on the transmitted indication of the set of component carriers by the first UE.

Aspect 11: The method of any of aspects 7 through 10, wherein transmitting the indication to the second UE further comprises: transmitting the indication via the component carrier supported by the first UE and the second UE, wherein the component carrier was indicated to at least the first UE by a base station.

Aspect 12: The method of any of aspects 7 through 11, wherein transmitting the indication to the second UE further comprises: transmitting the indication via a sidelink radio resource control message.

Aspect 13: The method of any of aspects 1 through 12, wherein receiving the message indicating the subset of component carriers further comprises: receiving the message indicating multiple subsets of component carriers and a sidelink identifier associated with each of the multiple subsets of component carriers, wherein each sidelink identifier is indicative of a different sidelink.

Aspect 14: The method of aspect 13, wherein receiving the message indicating the subset of component carriers further comprises: receiving the message comprising a length field, the length field indicating a number of component carriers, a number of octets, or a combination thereof associated with each sidelink identifier.

Aspect 15: The method of any of aspects 1 through 14, wherein receiving the control signaling indicating the set of component carriers further comprises: receiving, from a base station, a radio resource control message, or a medium access control (MAC) control element (MAC-CE) message indicating the set of component carriers.

Aspect 16: The method of any of aspects 1 through 15, wherein receiving the message indicating the subset of component carriers further comprises: receiving, from the second UE, the message indicating the subset of component carriers, wherein the second UE is an anchor UE to the first UE.

Aspect 17: The method of any of aspects 1 through 16, wherein receiving the control signaling indicating the set of component carriers further comprises: receiving, from the second UE, the message indicating the set of component carriers, wherein the second UE is an anchor UE to the first UE.

Aspect 18: A method for wireless communications at a base station, comprising: transmitting, to a first UE, control signaling indicating a set of component carriers allocated for sidelink communications for use by the first UE; and transmitting a message indicating a subset of component carriers from the set of component carriers for the first UE to use in communicating via a sidelink between the first UE and a second UE, wherein the subset of component carriers are supported by the first UE and the second UE.

Aspect 19: The method of aspect 18, further comprising: receiving, from the first UE, the second UE, or both, a signal comprising information associated with the sidelink between the first UE and the second UE.

Aspect 20: The method of aspect 19, wherein the information comprises a destination identifier associated with the second UE and the sidelink.

Aspect 21: The method of any of aspects 19 through 20, further comprising: determining the subset of component carriers that are common between the first UE and the second UE based at least in part on the received signal, wherein transmitting the message indicating the subset of component carriers is based at least in part on the determination.

Aspect 22: The method of any of aspects 18 through 21, wherein transmitting the message indicating the subset of component carriers further comprises: transmitting the message comprising a sidelink identifier, wherein the sidelink identifier indicates the sidelink over which the subset of component carriers are to be used by the first UE.

Aspect 23: The method of any of aspects 18 through 22, wherein transmitting the message indicating the subset of component carriers further comprises: transmitting a radio resource control signal, or a medium access control (MAC) control element (MAC-CE) signal comprising the message.

Aspect 24: The method of any of aspects 18 through 23, wherein transmitting the message indicating the subset of component carriers further comprises: transmitting the message indicating multiple subsets of component carriers and a sidelink identifier associated with each of the multiple subsets of component carriers, wherein each sidelink identifier is indicative of a different sidelink of the first UE.

Aspect 25: The method of aspect 24, wherein transmitting the message indicating the subset of component carriers further comprises: transmitting the message comprising a length field, the length field indicating a number of component carriers, a number of octets, or a combination thereof associated with each sidelink identifier.

Aspect 26: The method of any of aspects 18 through 25, further comprising: transmitting, to the second UE, the message indicating the subset of component carriers for the second UE to use in communicating via the sidelink between the first UE and the second UE.

Aspect 27: The method of any of aspects 18 through 26, further comprising: determining to update the subset of component carriers for the first UE and the second UE, wherein transmitting the message indicating the subset of component carriers is based at least in part on the determination.

Aspect 28: The method of any of aspects 18 through 27, further comprising: determining to update the set of component carriers for the first UE, wherein transmitting the control signaling indicating the set of component carriers is based at least in part on the determination.

Aspect 29: An apparatus for wireless communications at a first UE, comprising a processor; memory coupled with the processor; and instructions stored in the memory and executable by the processor to cause the apparatus to perform a method of any of aspects 1 through 17.

Aspect 30: An apparatus for wireless communications at a first UE, comprising at least one means for performing a method of any of aspects 1 through 17.

Aspect 31: A non-transitory computer-readable medium storing code for wireless communications at a first UE, the code comprising instructions executable by a processor to perform a method of any of aspects 1 through 17.

Aspect 32: An apparatus for wireless communications at a base station, comprising a processor; memory coupled with the processor; and instructions stored in the memory and executable by the processor to cause the apparatus to perform a method of any of aspects 18 through 28.

Aspect 33: An apparatus for wireless communications at a base station, comprising at least one means for performing a method of any of aspects 18 through 28.

Aspect 34: A non-transitory computer-readable medium storing code for wireless communications at a base station, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   receiving control signaling indicating a set of component carriers allocated for sidelink communications performed by the first UE;
   receiving, either from a base station or from a second UE, a message indicating a subset of component carriers from the set of component carriers to communicate using carrier aggregation via a sidelink between the first UE and the second UE, wherein the subset of component carriers are supported by the first UE and the second UE;
   transmitting, to the base station, a signal comprising information associated with the sidelink between the first UE and the second UE; and
   communicating, using the carrier aggregation, with the second UE via a component carrier from the subset of component carriers.

2. The method of claim 1, further comprising:
determining to communicate with the second UE via the sidelink.

3. The method of claim 2, wherein the information comprises a destination identifier associated with the second UE and the sidelink.

4. The method of claim 2, wherein receiving the message indicating the subset of component carriers further comprises:
receiving, from the base station, the message indicating the subset of component carriers based at least in part on the transmitted signal.

5. The method of claim 1, wherein receiving the message indicating the subset of component carriers further comprises:
receiving the message comprising a sidelink identifier, wherein the sidelink identifier indicates the sidelink over which the subset of component carriers are to be used.

6. The method of claim 1, wherein receiving the message indicating the subset of component carriers further comprises:
receiving a radio resource control signal, or a medium access control (MAC) control element (MAC-CE) signal comprising the message.

7. The method of claim 1, further comprising:
transmitting, to the second UE, an indication of the set of component carriers allocated to the first UE for the sidelink communications.

8. The method of claim 7, further comprising
performing a common component carrier determination procedure with the second UE to determine the subset of component carriers that are supported by the first UE and the second UE based at least in part on transmitting the indication to the second UE.

9. The method of claim 7, wherein the indication of the set of component carriers comprises a frequency identifier, a frequency reference point, a bandwidth, a subcarrier spacing, an offset, a bandwidth part, or a combination thereof associated with each component carrier of the set of component carriers.

10. The method of claim 7, further comprising:
receiving, from the second UE, a request for information associated with the subset of component carriers based at least in part on the transmitted indication of the set of component carriers by the first UE.

11. The method of claim 7, wherein transmitting the indication to the second UE further comprises:
transmitting the indication via the component carrier supported by the first UE and the second UE, wherein the component carrier was indicated to at least the first UE by a base station.

12. The method of claim 7, wherein transmitting the indication to the second UE further comprises:
transmitting the indication via a sidelink radio resource control message.

13. The method of claim 1, wherein receiving the message indicating the subset of component carriers further comprises:
receiving the message indicating multiple subsets of component carriers and a sidelink identifier associated with each of the multiple subsets of component carriers, wherein each sidelink identifier is indicative of a different sidelink.

14. The method of claim 13, wherein receiving the message indicating the subset of component carriers further comprises:
receiving the message comprising a length field, the length field indicating a number of component carriers, a number of octets, or a combination thereof associated with each sidelink identifier.

15. The method of claim 1, wherein receiving the control signaling indicating the set of component carriers further comprises:
receiving, from a base station, a radio resource control message, or a medium access control (MAC) control element (MAC-CE) message indicating the set of component carriers.

16. The method of claim 1, wherein receiving the message indicating the subset of component carriers further comprises:
receiving, from the second UE, the message indicating the subset of component carriers, wherein the second UE is an anchor UE to the first UE.

17. The method of claim 1, wherein receiving the control signaling indicating the set of component carriers further comprises:
receiving, from the second UE, the message indicating the set of component carriers, wherein the second UE is an anchor UE to the first UE.

18. A method for wireless communications at a base station, comprising:
transmitting, to a first user equipment (UE), control signaling indicating a set of component carriers allocated for sidelink communications for use by the first UE;
transmitting, to the first UE, a message indicating a subset of component carriers from the set of component carriers for the first UE to communicate using carrier aggregation via a sidelink between the first UE and a second UE, wherein the subset of component carriers are supported by the first UE and the second UE; and
receiving, from the first UE, the second UE, or both, a signal comprising information associated with the sidelink between the first UE and the second UE.

19. The method of claim 18, wherein the information comprises a destination identifier associated with the second UE and the sidelink.

20. The method of claim 18, further comprising:
determining the subset of component carriers that are common between the first UE and the second UE based at least in part on the received signal, wherein transmitting the message indicating the subset of component carriers is based at least in part on the determination.

21. The method of claim 18, wherein transmitting the message indicating the subset of component carriers further comprises:
transmitting the message comprising a sidelink identifier, wherein the sidelink identifier indicates the sidelink over which the subset of component carriers are to be used by the first UE.

22. The method of claim 18, wherein transmitting the message indicating the subset of component carriers further comprises:
transmitting a radio resource control signal, or a medium access control (MAC) control element (MAC-CE) signal comprising the message.

23. The method of claim 18, wherein transmitting the message indicating the subset of component carriers further comprises:
transmitting the message indicating multiple subsets of component carriers and a sidelink identifier associated with each of the multiple subsets of component carriers, wherein each sidelink identifier is indicative of a different sidelink of the first UE.

24. The method of claim 23, wherein transmitting the message indicating the subset of component carriers further comprises:
   transmitting the message comprising a length field, the length field indicating a number of component carriers, a number of octets, or a combination thereof associated with each sidelink identifier.

25. The method of claim 18, further comprising:
   transmitting, to the second UE, the message indicating the subset of component carriers for the second UE to use in communicating via the sidelink between the first UE and the second UE.

26. The method of claim 18, further comprising:
   determining to update the subset of component carriers for the first UE and the second UE, wherein transmitting the message indicating the subset of component carriers is based at least in part on the determination.

27. The method of claim 18, further comprising:
   determining to update the set of component carriers for the first UE, wherein transmitting the control signaling indicating the set of component carriers is based at least in part on the determination.

28. An apparatus for wireless communications at a first user equipment (UE), comprising:
   one or more processors;
   one or more memories coupled with the one or more processors; and
   instructions stored in the one or more memories and executable by the one or more processors to cause the apparatus to:
      receive control signaling indicating a set of component carriers allocated for sidelink communications performed by the first UE;
      receive, either from a base station or from a second UE, a message indicating a subset of component carriers from the set of component carriers to communicate using carrier aggregation via a sidelink between the first UE and the second UE, wherein the subset of component carriers are supported by the first UE and the second UE;
      transmit, to the base station, a signal comprising information associated with the sidelink between the first UE and the second UE; and
      communicate, using the carrier aggregation, with the second UE via a component carrier from the subset of component carriers.

29. An apparatus for wireless communications at a base station, comprising:
   one or more processors;
   one or more memories coupled with the one or more processors; and
   instructions stored in the one or more memories and executable by the one or more processors to cause the apparatus to:
      transmit, to a first user equipment (UE), control signaling indicating a set of component carriers allocated for sidelink communications for use by the first UE;
      transmit, to the first UE, a message indicating a subset of component carriers from the set of component carriers for the first UE to communicate using carrier aggregation via a sidelink between the first UE and a second UE, wherein the subset of component carriers are supported by the first UE and the second UE; and
      receive, from the first UE, the second UE, or both, a signal comprising information associated with the sidelink between the first UE and the second UE.

* * * * *